United States Patent
Christiansen et al.

(10) Patent No.: US 11,219,510 B2
(45) Date of Patent: Jan. 11, 2022

(54) HEALING CAP WITH SCANNABLE FEATURES

(71) Applicant: NOBEL BIOCARE SERVICES AG, Kloten (CH)

(72) Inventors: Piers Christiansen, Zurich (CH); Thomas Vizer, Zurich (CH); Marco Brunner, Horgen (CH)

(73) Assignee: Nobel Biocare Services AG, Kloten (CH)

( * ) Notice: Subject to any disclaimer, the term of this patent is extended or adjusted under 35 U.S.C. 154(b) by 0 days.

(21) Appl. No.: 15/776,988

(22) PCT Filed: Nov. 18, 2016

(86) PCT No.: PCT/EP2016/078192
§ 371 (c)(1),
(2) Date: May 17, 2018

(87) PCT Pub. No.: WO2017/085288
PCT Pub. Date: May 26, 2017

(65) Prior Publication Data
US 2018/0325631 A1     Nov. 15, 2018

(30) Foreign Application Priority Data
Nov. 20, 2015   (EP) ..................... 15195634

(51) Int. Cl.
*A61C 8/00*     (2006.01)
*A61C 9/00*     (2006.01)

(52) U.S. Cl.
CPC ............ *A61C 8/008* (2013.01); *A61C 8/0001* (2013.01); *A61C 8/0066* (2013.01); *A61C 9/004* (2013.01); *A61C 9/0053* (2013.01)

(58) Field of Classification Search
CPC ...... A61C 8/008; A61C 8/0001; A61C 9/0053
See application file for complete search history.

(56) References Cited

U.S. PATENT DOCUMENTS 5,350,297 A     9/1994 Cohen
5,431,567 A *   7/1995 Daftary ................ A61C 8/0048
                                               433/172
(Continued)

FOREIGN PATENT DOCUMENTS

CA          2042992        11/1992
WO     WO 2011/056452       5/2011
(Continued)

OTHER PUBLICATIONS

International Search Report for Application No. PCT/EP2016/078192 dated Dec. 20, 2016 in 3 pages [the ISR for the PCT Application of this US national phase application].

*Primary Examiner* — Ralph A Lewis
(74) *Attorney, Agent, or Firm* — Knobbe, Martens, Olson & Bear, LLP

(57) ABSTRACT

The disclosure of the present application relates to a healing abutment system and its use. The abutment system can include a base part adapted to be coupled to a dental implant via an abutment screw and a healing cap that can be coupled to the base part by a further screw. The healing cap can include features that can be scanned by an intra-oral scanning system or transferred to a physical impression to convey information regarding the position and orientation of the base part.

16 Claims, 20 Drawing Sheets

(56) References Cited

U.S. PATENT DOCUMENTS

| | | |
|---|---|---|
| 5,492,471 A | 2/1996 | Singer |
| 5,662,476 A | 9/1997 | Ingber et al. |
| 5,779,480 A | 7/1998 | Groll et al. |
| 5,813,858 A | 9/1998 | Singer |
| 5,829,977 A * | 11/1998 | Rogers .................. A61C 8/005 433/172 |
| 5,857,853 A | 1/1999 | Van Nifterick et al. |
| 5,871,358 A | 2/1999 | Ingber et al. |
| 5,904,483 A | 5/1999 | Wade |
| 5,961,328 A * | 10/1999 | Somborac ............ A61C 8/0018 433/173 |
| 5,964,591 A | 10/1999 | Beaty et al. |
| 6,120,292 A | 9/2000 | Buser et al. |
| 6,135,773 A | 10/2000 | Lazzara |
| 6,203,323 B1 | 3/2001 | Beaty et al. |
| 6,287,117 B1 * | 9/2001 | Niznick .................. A61C 8/008 433/173 |
| 6,325,628 B1 | 12/2001 | Morgan |
| 6,558,162 B1 | 5/2003 | Porter et al. |
| 6,619,958 B2 | 9/2003 | Beaty et al. |
| 6,688,887 B2 | 2/2004 | Morgan |
| 6,790,040 B2 | 9/2004 | Amber et al. |
| RE38,945 E | 1/2006 | Fried et al. |
| 7,104,795 B2 | 9/2006 | Dadi |
| 7,214,062 B2 | 5/2007 | Morgan |
| 7,322,824 B2 | 1/2008 | Schmitt |
| 7,344,376 B2 | 3/2008 | Beaty et al. |
| 7,425,131 B2 | 9/2008 | Amber et al. |
| 7,429,175 B2 | 9/2008 | Gittelson |
| 7,654,823 B2 | 2/2010 | Dadi |
| 7,661,956 B2 | 2/2010 | Powell et al. |
| D612,056 S * | 3/2010 | White, III .................... D24/156 |
| 7,747,418 B2 | 6/2010 | Leu et al. |
| 7,762,814 B2 | 7/2010 | Van der Zel |
| 7,988,449 B2 | 8/2011 | Amber et al. |
| 8,011,925 B2 | 9/2011 | Powell et al. |
| 8,038,440 B2 | 10/2011 | Swaelens et al. |
| 8,087,935 B2 | 1/2012 | Beaty et al. |
| 8,612,037 B2 * | 12/2013 | Powell .................... A61C 8/00 700/95 |
| 9,357,927 B2 * | 6/2016 | Thomsen .............. A61C 8/0001 |
| 2002/0039717 A1 * | 4/2002 | Amber .................. A61C 8/0001 433/172 |
| 2004/0121288 A1 | 6/2004 | Morgan |
| 2007/0281278 A1 * | 12/2007 | Jorneus ................ A61C 8/0001 433/173 |
| 2007/0281279 A1 | 12/2007 | Chander |
| 2007/0298374 A1 | 12/2007 | Carlton |
| 2008/0057476 A1 * | 3/2008 | Zettler ................ A61C 8/0066 433/173 |
| 2008/0153067 A1 | 6/2008 | Berckmans et al. |
| 2008/0176188 A1 * | 7/2008 | Holzner ............... A61C 8/0001 433/215 |
| 2008/0254411 A1 | 10/2008 | Bondar |
| 2009/0029314 A1 | 1/2009 | Carlton |
| 2009/0130630 A1 | 5/2009 | Suttin et al. |
| 2009/0220916 A1 | 9/2009 | Fisker et al. |
| 2010/0143871 A1 | 6/2010 | Berger |
| 2011/0183289 A1 | 7/2011 | Powell et al. |
| 2011/0200970 A1 | 8/2011 | Berckmans, III et al. |
| 2011/0244426 A1 | 10/2011 | Amber et al. |
| 2012/0295223 A1 * | 11/2012 | Robb ...................... A61C 8/008 433/173 |
| 2013/0177872 A1 | 7/2013 | Blaisdell et al. |
| 2013/0196290 A1 * | 8/2013 | Herrington .......... A61C 8/0001 433/173 |
| 2014/0205969 A1 * | 7/2014 | Marlin ................ A61B 6/4085 433/173 |
| 2019/0247150 A1 | 8/2019 | Kaup et al. |
| 2019/0282340 A1 | 9/2019 | Christiansen et al. |

FOREIGN PATENT DOCUMENTS

| | | |
|---|---|---|
| WO | WO 2014/008987 A1 | 1/2014 |
| WO | WO 2016/203030 | 12/2016 |
| WO | WO 2017/121898 | 7/2017 |

* cited by examiner

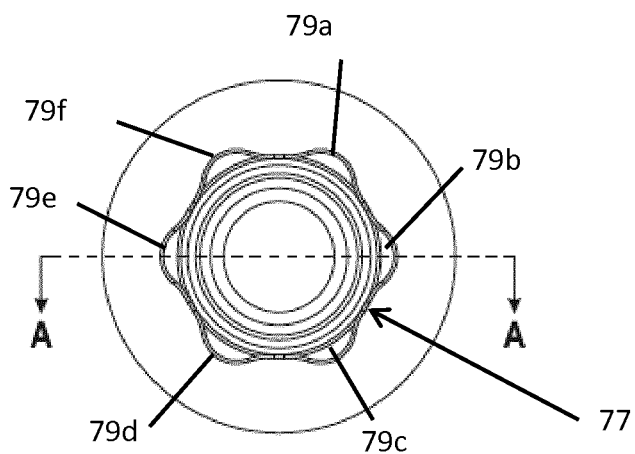
FIG. 3A
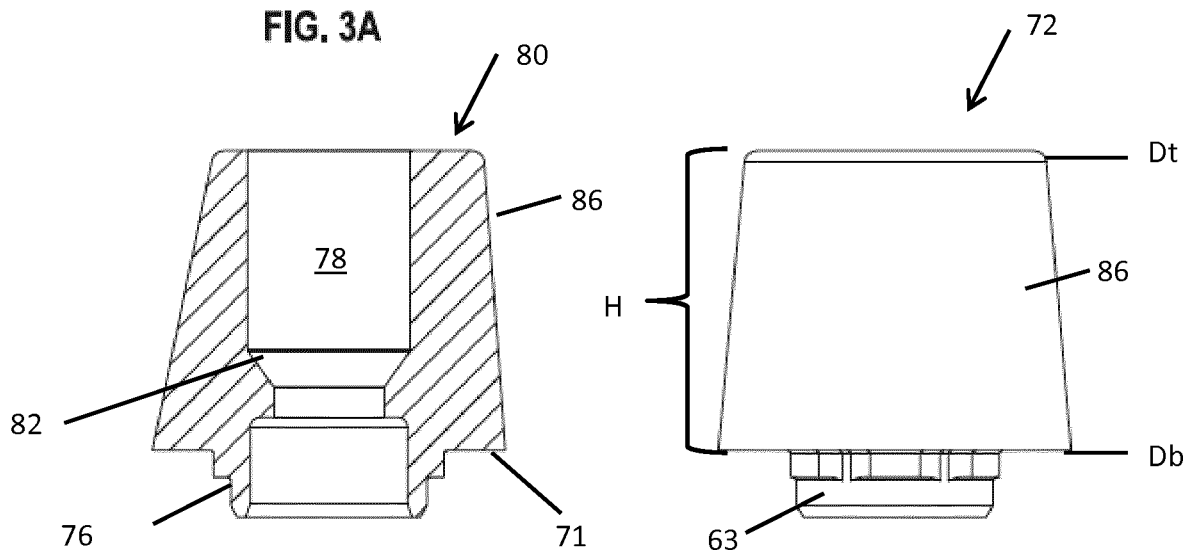
FIG. 3B
FIG. 3D
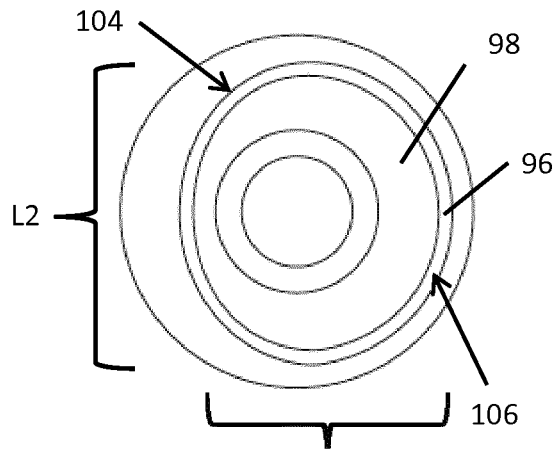
FIG. 3C
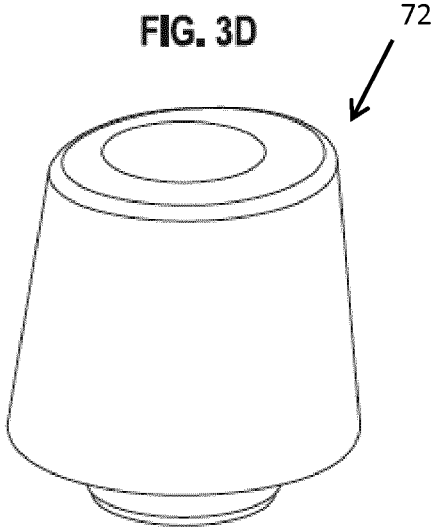
FIG. 3E

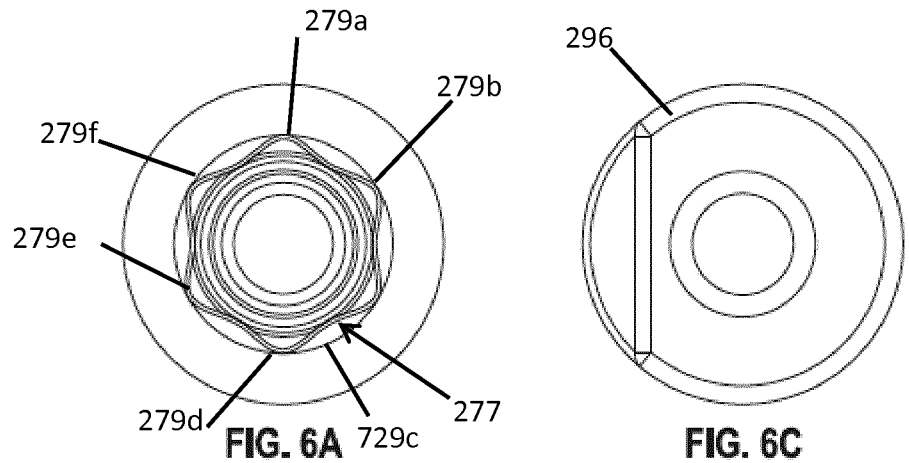
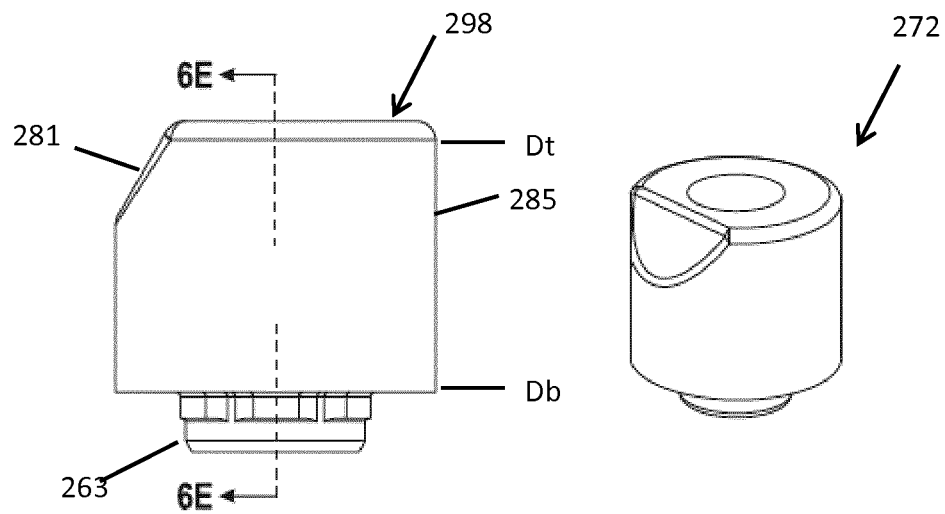
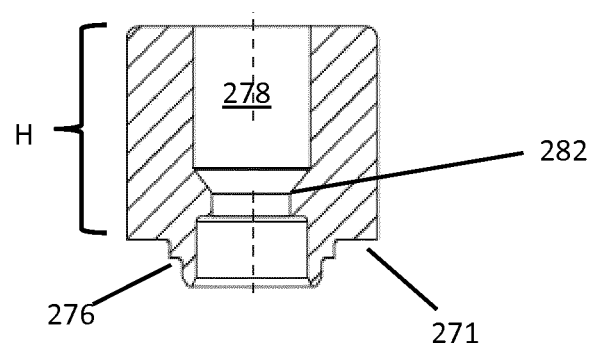

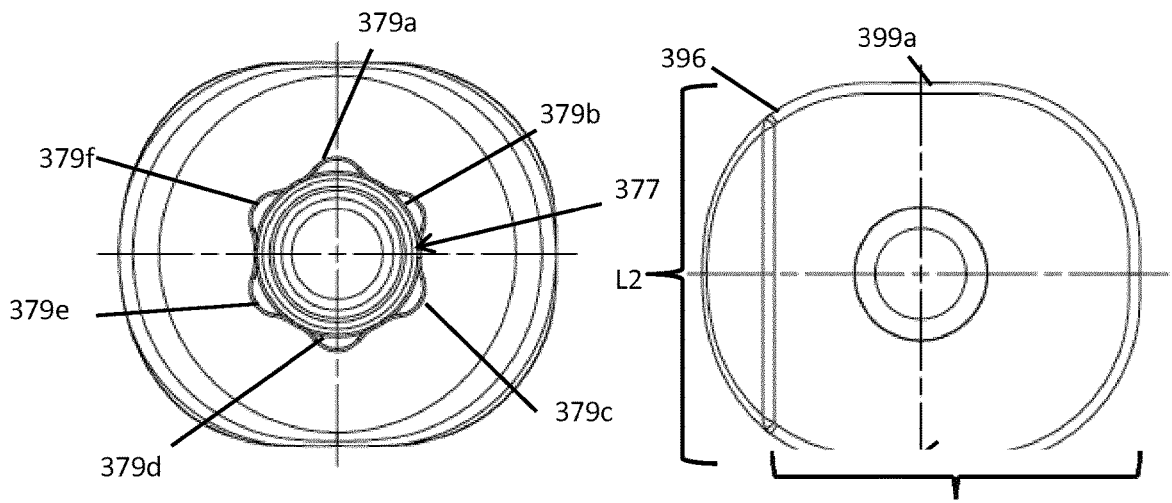
FIG. 8A
FIG. 8C
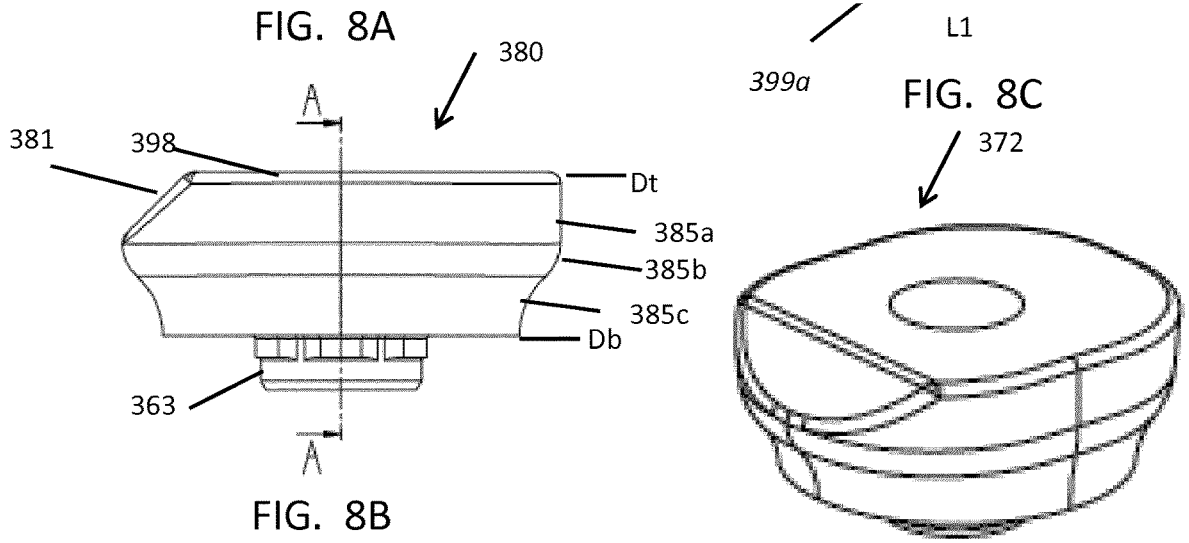
FIG. 8B
FIG. 8D
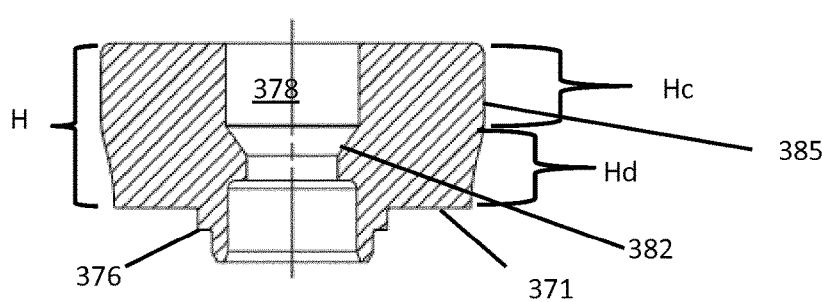
FIG. 8E

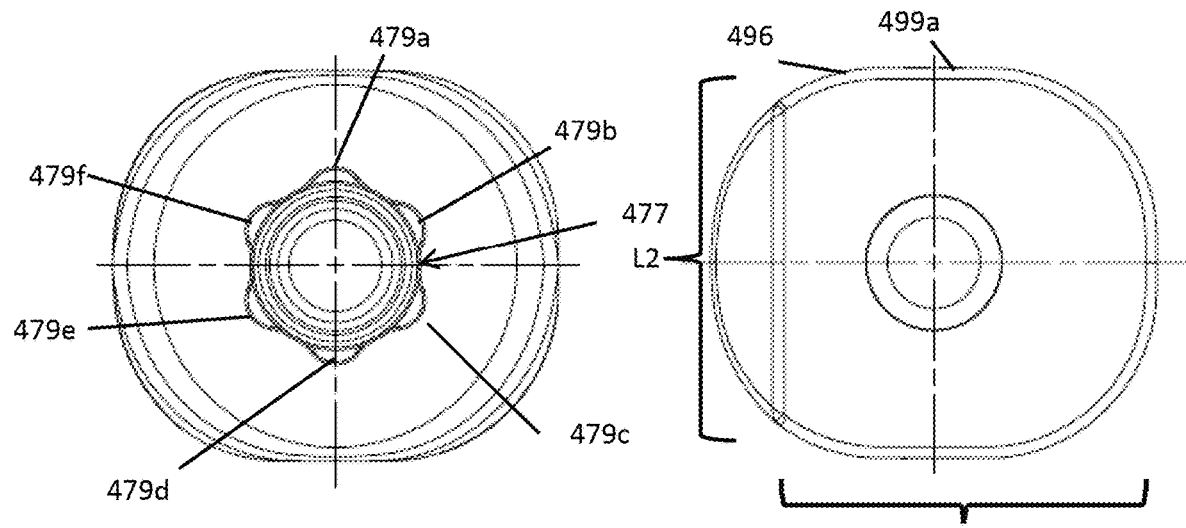
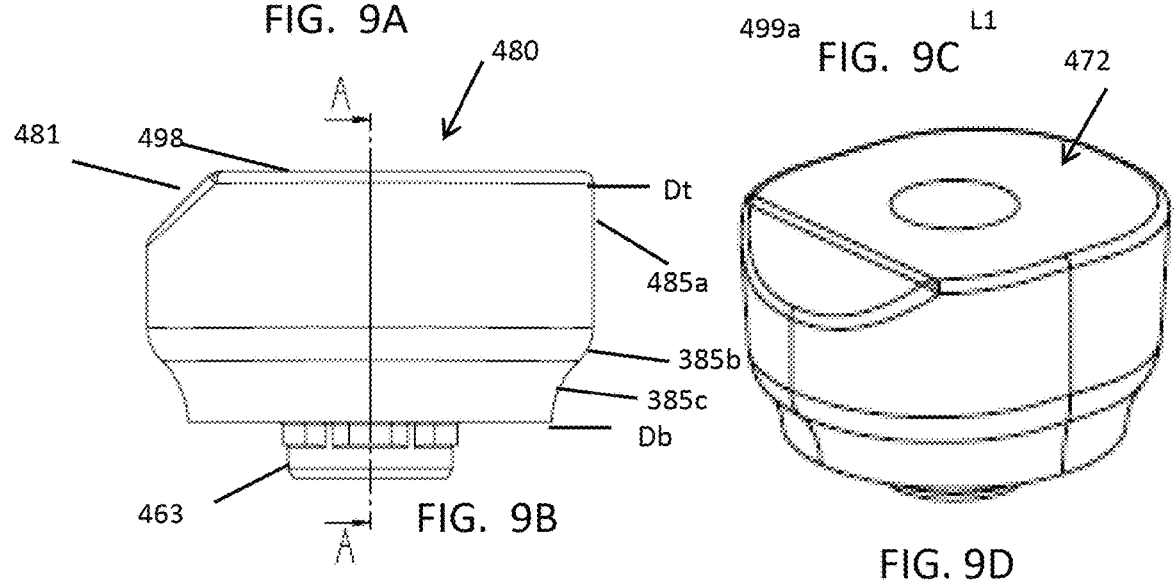
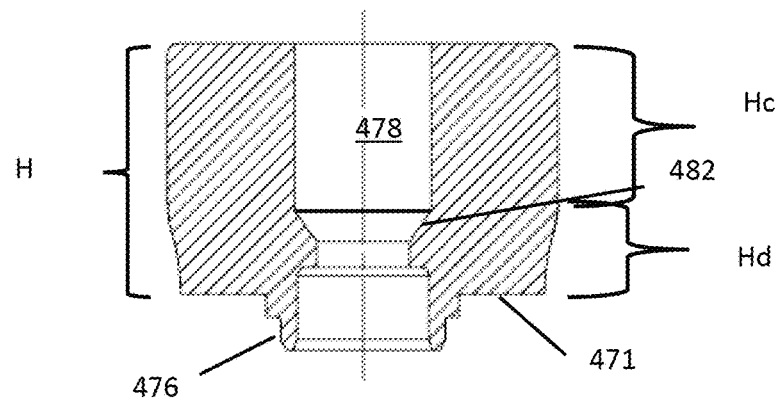
FIG. 9E

Healing Period    Final Restoration

HEALING CAP WITH SCANNABLE FEATURES

CROSS-REFERENCE TO RELATED APPLICATIONS

This application is a national stage application under 35 U.S.C. § 371 of International Application No. PCT/EP2016/078192, filed on Nov. 18, 2016, which published in English as WO 2017/085288 A1 on May 26, 2017, and which claims priority benefit of EP Patent Application No. 15195634.9, filed on Nov. 20, 2015.

BACKGROUND

Field

The present application relates to dental prosthetic systems and methods, and more specifically, to a healing abutment with scannable features.

Description of the Related Art

Dental prosthetic systems can be used to reconstruct defects in a patient's jaw such as missing or misaligned teeth. Dental prosthetic systems can include components such as a dental implant, an intermediary structure such as an abutment, and a final prosthesis or restoration such as a crown, bridge or a denture, which can replicate a patient's missing tooth or teeth.

The placement of the dental implant can be accomplished in stages. For example, in a first stage, a dental practitioner can review radiographs and dental models to determine the proper placement and axial alignment of the dental implant. In a second stage, a dental surgeon can access the bone through the mucosal tissue. With the use of a prefabricated stint, the surgeon can drill or bore out the maxillary or mandibular bone. The dental implant can then be pressed or screwed into the bone. A healing abutment, having a height at least equal to the thickness of the gingival tissue can be coupled to the dental implant to guide the growth of the gingival tissue during a healing period.

In certain procedures, an impression can be taken after the dental implant is implanted. The impression can be used to record the position and orientation of a top surface of the dental implant. The position and orientation of the top surface dental implant can then be reproduced in a stone or plaster analogue of the patient's mouth. The main objective of the impression is to properly transfer the size and shape of adjacent teeth in relation to the top surface of the permanently placed dental implant to the dental technician. The plaster analogue provides the laboratory technician with a precise model of the patient's mouth, including the orientation and position of the top surface dental implant relative to the surrounding teeth. Based on this model, the technician can construct a final restoration that will accurately mate with the dental implant positioned in the patient's mouth. To aid in the impression process, an impression coping or device can be coupled to the top surface of the dental implant. The impression coping can leave an impression in the impression material or can be picked up and retained in the impression material. In a final stage of the restorative process, the healing abutment can be replaced with the final restoration.

More recently, intra-oral scanning (IOS) has emerged as an alternative to taking a physical impression and/or creating a stone or plaster analogue of the patient's mouth. In such procedures, a handheld intra-oral scanner can be used to capture a three-dimensional data and/or images of the shape of adjacent teeth in relation to the permanently placed implant and/or the configuration and orientation of the dental implant through the use of a scan body, which can be coupled to the top of the dental implant. This information can be used to construct a physical or digital model of the patient's anatomy which can be used to design and/or fabricate a final restoration.

One system currently in use is the BellaTek Encode® Impression System by Biomet 3i. In this system, a BellaTek Encode® Healing Abutment is coupled to a dental implant. The BellaTek Encode® Healing Abutment can include notches that relay abutment design and milling information, eliminating the need for an impression coping. An intra-oral scan can be taken of the BellaTek Encode® Healing Abutment.

SUMMARY

One aspect of the dental prosthetic systems and methods described herein is the recognition that the current IOS systems have certain disadvantages. For example, the BellaTek Encode® Healing Abutment is made of titanium and the code provided on the abutment is complicated to form and requires additional manufacturing steps. In addition, the BellaTek Encode® Healing Abutment needs to be removed before a final restoration is coupled to the dental implant. Removal of the healing abutment can disturb and/or irritate the patient's gum tissue.

Accordingly, some embodiments comprise a healing cap or a scan body (in the following description, healing cap can also mean "healing cap or scan body") for coupling to a dental component. The healing cap can include an apical end and a coronal end comprising a side surface and a top surface, the top surface having an edge that forms an asymmetrical shape.

In some embodiments, the apical end of the healing cap includes an index portion with at least one protrusion spaced about a cylindrical post. In certain embodiments, the index portion includes six protrusions spaced equally about a cylindrical post. The healing cap can include internal bore extending from the apical end to the coronal end of the healing cap. The asymmetrical shape can include a first portion having a crescent shape and a second portion having a circular shape. The asymmetrical shape can include a first portion having an elliptical shape with a first eccentricity and a second portion having an elliptical-shape with a second eccentricity. The asymmetrical shape can have only the first portion and a second portion. The asymmetrical shape can include two flat sides. The asymmetrical shape can have a length L1 in an x direction and length L2 in a y direction which forms an aspect ratio L1/L2 that less than or greater than 1. The top surface of the healing cap can be planar and can lie perpendicular to a longitudinal axis of the healing cap. The side surface can taper apically, along the longitudinal axis of the healing cap or scan body, from a smaller top diameter Dt at a coronal end of the healing cap to a larger base diameter and then extend further apically with a substantially cylindrical shape.

Some embodiments can include a method of creating final restoration using a healing cap as described in the preceding paragraphs. Said method may comprise the follow steps:
  scanning the healing cap or a scan body as described in the preceding paragraphs with an intra-oral scanner or taking an impression of the healing cap or of the scan body as described in the preceding paragraphs;

using information from scanning or taking an impression of the healing cap or scan body with an intra-oral scanner to design a dental restoration producing the dental restoration designed.

In some embodiments a healing abutment system includes a base part and a healing cap. The base part can be configured to be attached to a dental implant. The base part can be configured to selectively support a final restoration and can have an outer surface that corresponds to a height of soft tissue adjacent the installed dental implant. The healing cap can be configured to be coupled to the base part. The healing cap can have at least one feature configured to be scanned by an intra-oral scanner or transferred to a physical impression to transfer information regarding the orientation and position of the base part.

In some embodiments, the healing abutment system includes an abutment screw and wherein the base part is coupled to the dental implant by the abutment screw. In some embodiments, the healing abutment system can also include a further screw configured to couple the healing cap to the base part, wherein the further screw includes a threaded end configured to be retained within a head of the abutment screw. A coronal end of the base part can include includes an index portion and the healing cap can include an apical end with a corresponding index portion. In some embodiments, the index portion of the base part includes at least one concave lobe spaced about a circular perimeter and the index portion of the healing cap includes at least one corresponding protrusion spaced about a cylindrical post. In some embodiments, the index portion of the base part includes six concave lobes spaced about a circular perimeter and the index portion of the healing cap includes six corresponding one protrusions spaced about a cylindrical post. A coronal end of the healing cap can include a side surface and a top surface, and the top surface can have an edge that forms an asymmetrical shape. In some embodiment, the healing cap has a top asymmetrical shape having a first portion having a crescent shape second portion having a circular shape. The asymmetrical shape can have a length L1 in an x direction and length L2 in a y direction which forms an aspect ratio L1/L2 that less than or greater than 1. The top surface of the healing cap can be planar and can lie perpendicular to a longitudinal axis of the healing cap.

Some embodiments can include a method of creating final restoration using the healing abutment system as described in the preceding paragraphs Some embodiments can include a method of using of a healing abutment system as described in the preceding paragraphs wherein the base part is used to selectively support both a cement-retained final restoration and a screw-retained prosthetic component.

In some embodiment, a dental method includes attaching a base part to a dental implant installed in a jawbone of a patient, coupling a healing cap to the base part, scanning the healing cap with an intra-oral scanner or taking an impression of the healing, using information from scanning or taking an impression of the healing cap with an intra-oral scanner to design a final restoration, removing the healing cap from the base part; and coupling the final restoration to the base part.

Some embodiments can include a scan body for coupling to a dental implant. The scan body can include an apical end and a coronal end comprising a side surface and a top surface, the top surface having an edge such that forms an asymmetrical shape.

In some embodiments, the apical end of the scan body can include an index portion with at least one protrusion spaced about a cylindrical post. The index portion can include six protrusions spaced equally about a cylindrical post. The scan body can include an internal bore extending from the apical end to the coronal end of the healing cap. In some embodiments, the asymmetrical shape includes a first portion having a crescent shape second portion having a circular shape. The asymmetrical shape can have a length L1 in a x direction and length L2 in a y direction which forms an aspect ratio L1/L2 that less than or greater than 1.

Some embodiments can include a method of creating final restoration using the scan body described in the preceding paragraphs.

In some embodiments, an abutment system includes a base part configured to be attached to a bone level dental implant. The base part can be configured to selectively support a final restoration and having a outer surface that correspond to a height of soft tissue adjacent the installed bone level dental implant. The base part can have a coronal end that includes an index portion, wherein index portion of the base part includes six concave lobes spaced about a circular perimeter.

Some embodiments can include a use of an abutment system according to the preceding paragraph wherein the base part is used to selectively support both a cement-retained final restoration and a screw-retained prosthetic component.

Some embodiments can include a use of an abutment system according to the preceding paragraphs wherein the base part is used to support a healing cap.

For purposes of summarizing the invention and the advantages achieved over the prior art, certain objects and advantages of the invention have been described in this application. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the embodiments having reference to the attached figures, the invention not being limited to any particular embodiment(s) disclosed.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 3A is a bottom view of a healing cap according to one embodiment.

FIG. 3B is a cross-sectional side view of the healing cap of FIG. 3A taken through line A-A of FIG. 3A.

FIG. 3C is a top view of the healing cap of FIG. 3A.

FIG. 3D is a side view of the healing cap of FIG. 3A.

FIG. 3E is a side perspective view of the healing cap of FIG. 3A.

FIG. 6A is a bottom view of a healing cap according to one embodiment.

FIG. 6B is a side view of the healing cap of FIG. 6A.

FIG. 6C is a top view of the healing cap of FIG. 6A.

FIG. 6D is a side perspective view of the healing cap of FIG. 6A.

FIG. 6E is a cross-sectional view of the healing cap of FIG. 6A taken through line 6E-6E of FIG. 6B.

FIG. 8A is a bottom view of a healing cap according to one embodiment.

FIG. 8B is a side view of the healing cap of FIG. 8A.

FIG. 8C is a top view of the healing cap of FIG. 8A.

FIG. 8D is a side perspective view of the healing cap of FIG. 8A.

FIG. 8E is a cross-sectional view of the healing cap of FIG. 8A taken through line A-A of FIG. 8B.

FIG. 9A is a bottom view of a healing cap according to one embodiment.

FIG. 9B is a side view of the healing cap of FIG. 9A.

FIG. 9C is a top view of the healing cap of FIG. 9A.

FIG. 9D is a side perspective view of the healing cap of FIG. 9A.

FIG. 9E is a cross-sectional view of the healing cap of FIG. 9A taken through line 9E-9E of FIG. 9B.

DETAILED DESCRIPTION

Figure 1A:
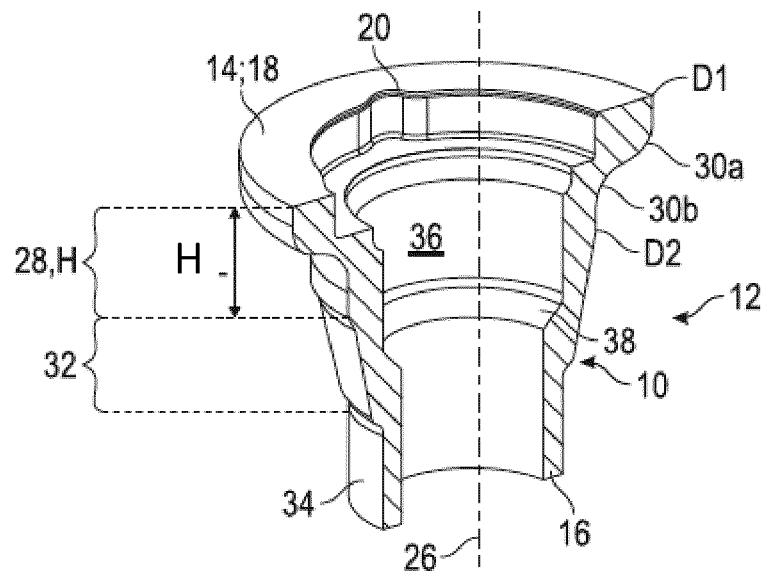
FIG. 1A is a cross-sectional side view of a base part of an abutment system according one embodiment.

Embodiments of a prosthetic system and method will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications, combinations and sub-combinations and/or equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "proximal," "distal," "apical" "front," "back," "coronal" "rear," and "side" describe the orientation and/or location of portions of the components or elements within a consistent but arbitrary frame of reference which is made clear by reference to the text and the associated drawings describing the components or elements under discussion. Such terminology may include the words specifically mentioned above, derivatives thereof, and words of similar import.

Figure 10:
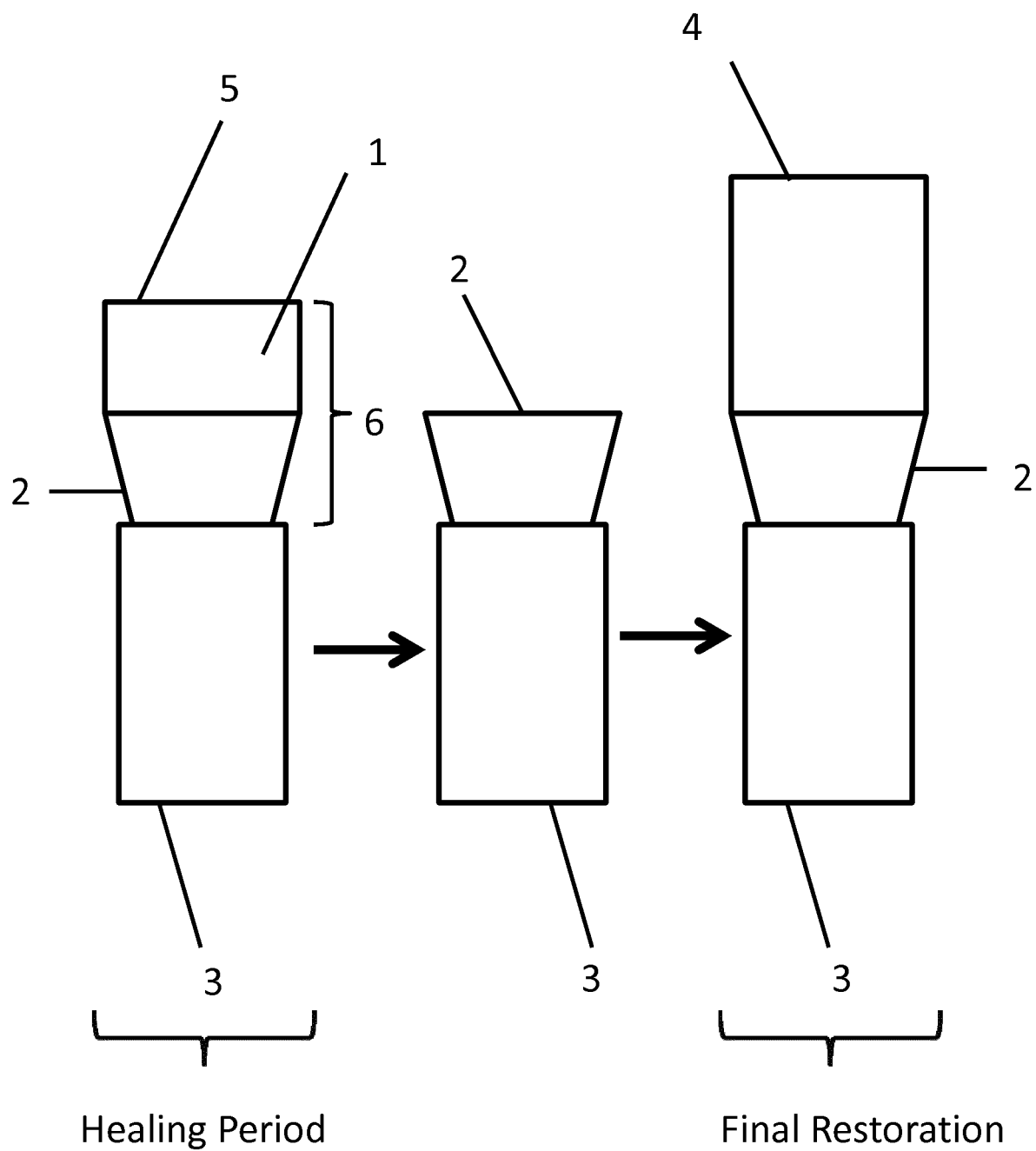
FIG. 10 is a flow chart a method according to certain embodiments of the present disclosure

As will be described, certain embodiments relate to a maxillofacial prosthesis system and methods of using the system. With reference to FIG. 10, an embodiment is directed to a healing cap 1, which can be coupled to a base part 2, which in turn, can be coupled to a dental implant 3. In one embodiment, the dental implant 1 can be a bone level" dental implant as described below. In modified arrangements the healing cap 1 can be coupled directly to the dental implant 3 or to one or more intermediate components between the dental implant 3 and the healing cap 1. However, coupling the healing cap 1 to the base part 2 has certain advantages as explained below. For example, the healing cap 1 and the base part 2 when coupled together can form a healing abutment system 6, which can be regarded a two-piece healing abutment, wherein the two pieces are the base part 2 and the healing cap 1. In such a system the base part can be configured to guide soft tissue growth. As will be explained below in certain arrangements, the base part 1 does not need to be removed after a healing period and can form part of a final restoration. Thus the base part 2 of the healing abutment system 6 does not need removed which in turn reduces disturbances to the soft tissue.

As will be described below, the heating abutment 1 can have top surface 5 configured such that when the healing cap 1 is scanned by scanning system information about the position and orientation of the base part 2 and/or the implant 3 can be deduced based upon the shape of the top surface 5 of the healing cap 1 and the position and orientation of the top surface 5 with respect to the patient's anatomy. In certain arrangements, the top surface 5 can also have characteristics that can be used to transfer or convey information about the physical characteristics of the healing cap 1, the base part 2 and/or the dental implant 3, such as, for example, the size, diameter, height, manufacturer, or platform type of the component.

As shown in FIG. 10, in one embodiment, the healing cap 1 and the base part 2 can be coupled to the dental implant 3 and can remain coupled to the dental implant during a first period of time and in one embodiment this first period of time can correspond to a healing period in which the gingival tissue can be shaped by the base part 2. As mentioned above, in such an arrangement, the base part 2 and healing cap 1 can form a healing abutment system 6, which can be regarded a two-piece healing abutment, wherein the two pieces are the base part 2 and the healing cap 1. After the first period of time, the healing cap 1 can be removed from the base part 2 and a final restoration 4 or a portion of a final restoration can be attached to the base part 2. In such arrangements, the base part 2 does not have to be removed from the dental implant 3 after being installed. The base part 2 can be configured to contact the soft tissue of the patient and thus disturbance of the portion of the soft tissue contacted by the base part 2 is reduced when the healing cap 1 is removed and the final restoration is coupled to the base part 2. As noted above, the healing cap 1 can have a top surface 5, the shape of which can convey information about the position, orientation and/or physical characteristics of the healing cap 1, base part 2 and/or dental implant 3. As will be explained below, the top surface 5 can be recorded and/or measured through the use of an intra-oral scanner and/or through the use of a physical impression. While many embodiments of the healing cap 1 are described and shown in combination with the use of the base part 2, in other embodiments, the healing cap 1 can be used without the base part 2 or with one or more additional components placed between the base part 2 and the dental implant 3 and/or healing cap 1. Accordingly, in some embodiments, the healing cap 1 can function as a scan body that is used to determine the orientation and position of the base part 2 or dental implant 3.

Figure 1B:
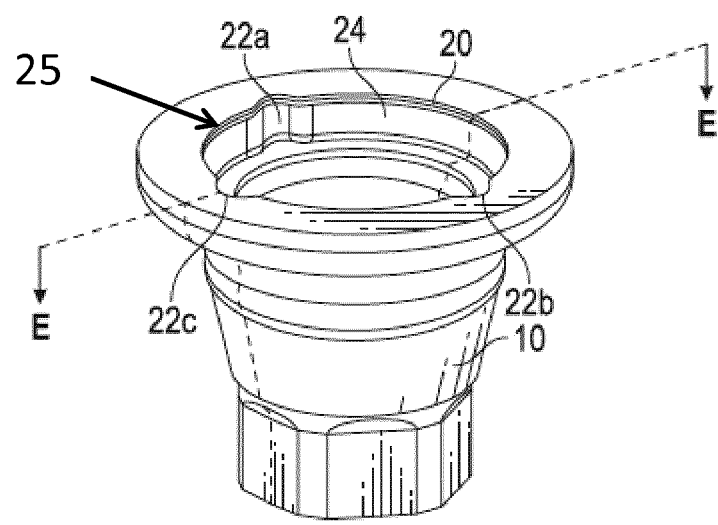
FIG. 1B is a side perspective view of the base part of FIG. 1A.
Figure 1C:
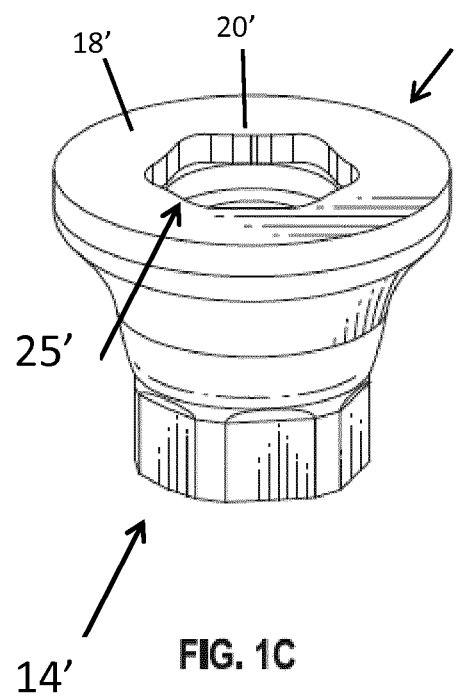
FIG. 1C is side perspective view of a base part according to another embodiment.

With reference now to FIGS. 1A and 1B, these figures show an embodiment of a base part 10 of an abutment system 12 (see FIG. 2B), which can be used in combination with certain embodiments of a healing cap described herein. The base part 10 is described as "universal' in that in certain embodiments the base part 10 can be used with both a cement-retained final restoration and/or a screw-retained prosthetic component, as is described in U.S. Publication No. 2014/0011160 filed Jun. 29, 2013 (U.S. application Ser. No. 13/931,118), the entirety of which is hereby incorporated by reference herein. In addition, in certain embodiments, the base part 10 can be coupled to a dental implant and remain coupled to a dental implant during a healing period in which a healing cap is coupled to the base part 10. In such embodiments, the base part 10 can remain coupled to the dental implant while the healing cap can be removed and replaced with a final abutment, final restoration or portion of a final restoration. In this manner, the base part 10 can remain in place, which can advantageously reduce trauma to the patient's gum tissue.

The base part 10 is preferably made in one piece, and it can be made of for example titanium or ceramic material (e.g. zirconia). As illustrated in FIGS. 1A and 1B, the base part 10 can have a coronal end 14 and an apical end 16. At the coronal end 14, the base part 10 can have a flat circumferential top surface 18 at the outer perimeter of the base part 10. The flat circumferential top surface 18 can allow for an effective seal without any cement or the like against another component having a corresponding flat surface.

The flat circumferential top surface 18 can have an inner perimeter 20 which may be circular. The inner circular perimeter 20 can accommodate at least one indexing element, which in the illustrated embodiment is in the form of one or more concave lobes 22a-c that are uniformly distributed about the inner circular perimeter 20. The illustrated embodiment includes three concave lobes 22a-c that can extend apically from the inner circular perimeter 20, in an inner side wall 24 of the base part 10. The indexing elements and inner perimeter form and index portion 25 that can prevent rotation (around the longitudinal axis 26 of the base part 10) of a component having corresponding indexing elements being attached to the base part 10. Such a component may for instance be a screw-retained single restoration (crown) or a healing cap such as the healing caps described herein. However, a component without corresponding index portion 25 can be used in certain embodiments. Such a component may only have a circular interface corresponding to the inner circular perimeter 20. It is appreciated that other configurations of the index portion 25 are possible, for example convex lobes (not shown) instead of the concave lobes 22a-c can be used in certain embodiment and/or other configurations and combinations of interlocking protrusions and recesses. Also, the number of indexing elements may be varied. For example, FIG. 1C-F illustrate an embodiment of the base part 10' in which the index portion 25' includes six concave lobes 22'a-f uniformly distributed about the inner circular perimeter 20.

When designing a final restoration, it can be useful to accurately know the position and orientation of the top surface 18, 18' with respect to the anatomy of the patient and/or the orientation the indexing portion 25, 25' with respect to a longitudinal axis of the base part 10. Specifically, the position and orientation of the top surface 18 and/or index portion 25, 25' can be used to design a final restoration or portion thereof. In this manner, the final restoration can be configured such that it can accurately mate with the top surface 18, 18' and/or indexing portion 25, 25' in a manner such that the final restoration when installed is positioned in the desired location.

Figure 1D:
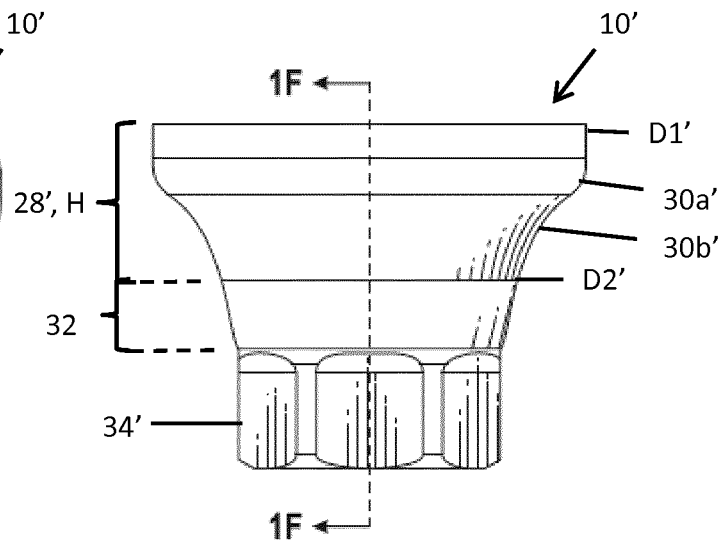
FIG. 1D is a side view of the base part of FIG. 1C.
Figure 1E:
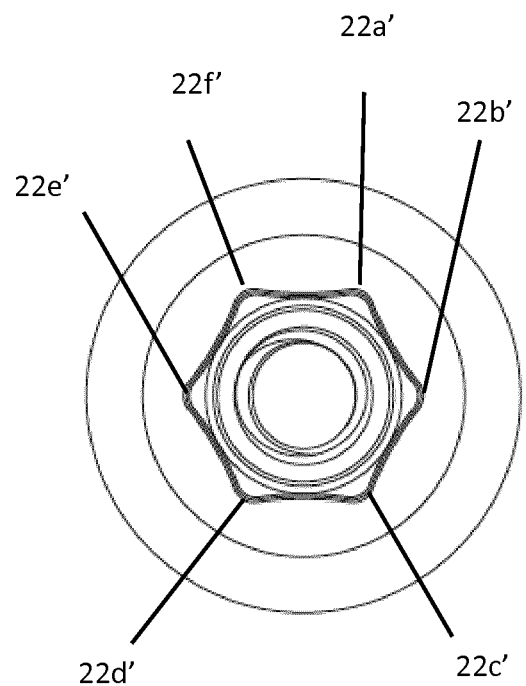
FIG. 1E is a top view of the base part of FIG. 1C.
Figure 1F:
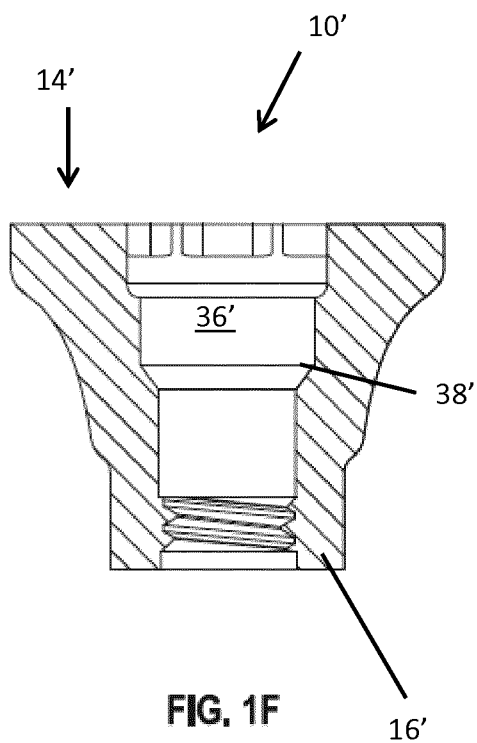
FIG. 1F is a cross-sectional view of the base part of FIG. 1D taken through line A-A of FIG. 1D.

With reference back to FIG. 1A-B, extending apically from the flat circumferential top surface 18, the base part 10 can have an outer surface 28 devised for exposure to soft tissue or gum. The outer surface 28 may have a length L (a distance measured along the curved outer surface 28) that is greater than its height H (measured in the direction of a longitudinal axis of the base part 10 as shown in FIG. 1D), in order to increase the soft tissue contact length, improve soft tissue health and/or facilitate soft tissue attachment. The length L can be for example about 2.5 mm, while the height can be between about 1.0 and 5.0 mm.

The limited height or low profile of the base part 10 can also enable healing without unnecessary loading of the dental implant.

The outer surface 28 may for instance be at least partly curved between its coronal and apical ends. In the embodiment shown in FIG. 1A-B, the curved outer surface 28 extends from a larger coronal diameter D1 to a smaller coronal diameter D2, first in a convex shape 30a and then in a concave shape 30b. Other configurations are possible in modified embodiments. For example, the outer surface 28 can comprise straight portions that are inclined in relation to each other.

With reference back to the illustrated embodiment of FIG. 1C-F wherein the index portion 25' can include six concave lobes 22'a-f, as mentioned above, the outer surface 28' can have other configurations. In this embodiment, the curved outer surface 28' extends from a larger coronal diameter D1' to a smaller coronal diameter D2', first in a convex shape 30a' and then in a concave shape 30b' which tapers more gradually as compared to the embodiment of FIG. 1A-B.

In modified embodiments, the outer surface 28, 28' may be provided with one or several circumferential or ring-shaped grooves (not shown), whereby sufficient length and additional geometrical locking of the soft tissue may be established. Also, a lower (apical) portion of the outer surface 28, 28' may be roughened for improved stabilization.

The outer surface 28 can transition apically into an external surface 32 of the base part 10. The external surface 32 is generally adapted to abut against an internal connection surface of a dental implant such as a bone level dental implant, as will be explained further below. The external surface 32 may be straight but inclined with respect to the longitudinal axis 26 of the base part 10, with a decreasing diameter towards the apical end 14 of the base part 10. In other words, a conical or tapered portion is formed on the base part 10. In an alternative embodiment (not shown), the external surface may be parallel to the longitudinal axis 26 of the base part 10, depending on what implant the base part 10 should be attached to.

At the apical end 14, the base part 10, 10' of FIGS. 1A-B and 1C-D may comprise an interlock portion 34. The interlock portion 34 can comprise an external, generally hexagonal shape that is sized to fit within an interlock recess of the dental implant. The external surface 32 and interlock portion 34 of the illustrated embodiments of FIGS. 1A-B and 1C-D are configured such that the base part 10, 10' can mate with internal connection of a dental implant and in particular the internal conical connection with hexagonal interlocking of the NobelActive® dental implant sold by Nobel Biocare®. However, in modified embodiments the apical end 14 of the base part 10, 10' can be formed to mate with other types of connection features and/or other dental implants such as, for example, an external hex connection, a NobelReplace® implant with three interlocking channels (see e.g., U.S. Pat. No. 8,721,335).

The base part 10 can include an internal bore 36 extending from the coronal end 14 to the apical end 16 and coinciding with the longitudinal axis 26 of the base part 10. The internal bore 36 can include a seat 38 for supporting an internal screw (as described below).

As noted above, FIG. 1C-F illustrate an embodiment of the base part 10' in which the index portion 25' includes six concave lobes 22a'-f uniformly distributed about the inner circular perimeter 20 and the outer surface 28' can be shaped in a different manner than the embodiment of FIG. 1A-B. Otherwise, the embodiment of FIG. 1C-F can be similar to the embodiment of FIG. 1A-B and thus similar features and components are labeled with the same reference number with an additional' added to the reference number (e.g., 16', 18', 34', 36', 38' etc.) to indicate similar components. Reference can be made to description above with reference to FIG. 1A-B for additional details and other embodiments with respect to such features and components not specifically described herein.

Figure 2A:
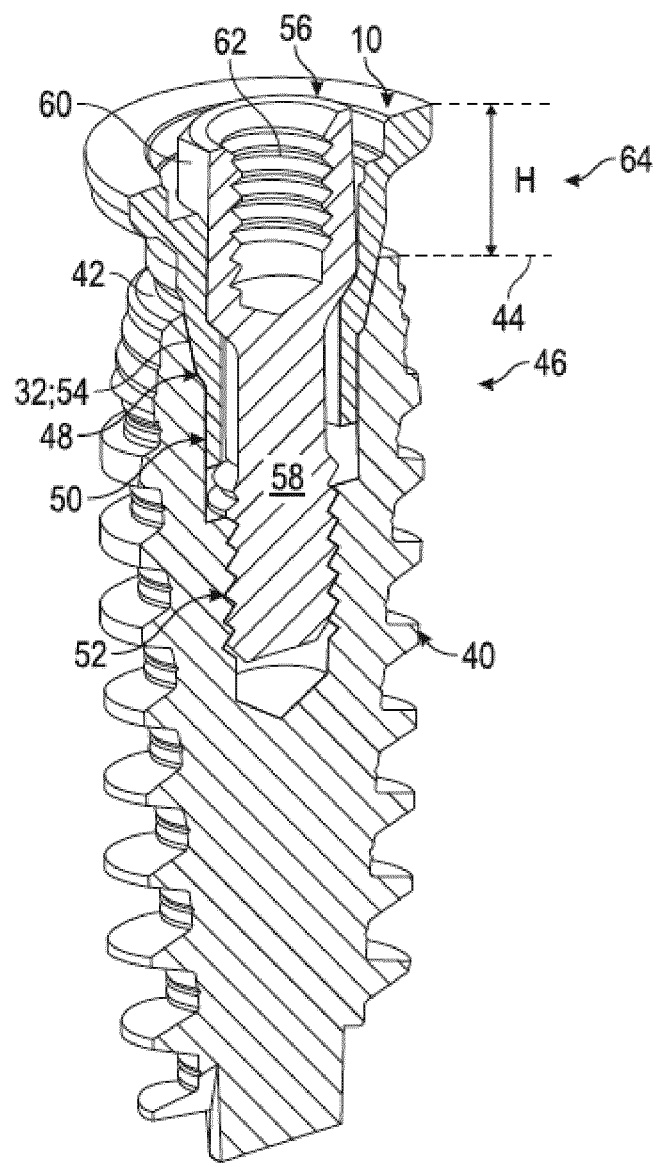
FIG. 2A is a cross-sectional side view of the base part of FIG. 1A attached to a dental implant.
Figure 2B:
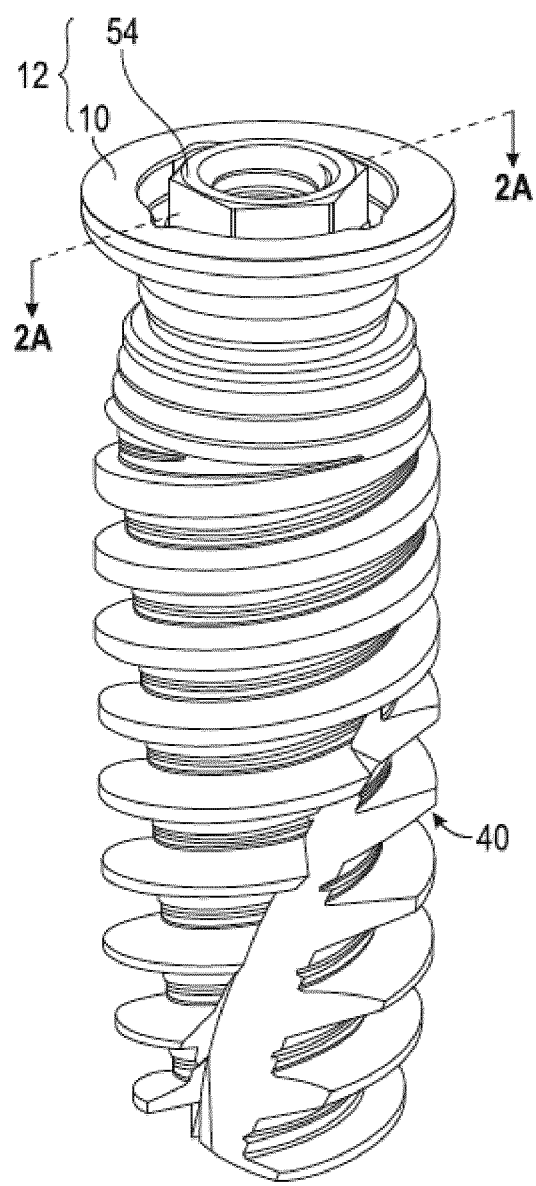
FIG. 2B is a perspective view of the arrangement in FIG. 2A.

FIG. 2A-B show the base part 10 of FIG. 1A-B attached to a dental implant 40. The dental implant 40 can a "bone level" dental implant, meaning that its coronal end 42 is intended to be placed substantially in level with the edge or crest 44 of the jawbone 46 of a patient, when the dental implant 40 is installed in the jawbone 46. The dental implant 40 may for example be of the type disclosed in WO 2008/128757 A2, the contents of which are incorporated by reference herein. However, as noted above, other dental implants can be used as well. For example, dental implants that are not bone level implants can be used in some embodiments and/or dental implants with other types of connection features in some embodiments. The base part 10' of FIG. 1C-F can be coupled to the dental implant 40 in a similar manner as described herein and shown in FIG. 4A-B.

The dental implant 40 can include an internal connection interface that is open to the coronal (or proximal) end 42 of the dental implant 40. The internal connection interface comprises a conical chamber 48, a hexagonal interlock recess 50, and an internally threaded portion 52. The conical chamber 48 has an inclined internal connection surface 54 matching the external surface 32 of the tissue level abutment part 10.

In use, the base part 10, 10'can be attached to the bone level dental implant 40 via of an abutment screw 56, as shown in FIG. 2A-B. The abutment screw 56 can be comprised in the abutment system 12. The abutment screw 56 can have an apical external threaded portion 58 for engaging the internally threaded portion 52 of the dental implant 40. Further, the abutment screw 56 has a head 60 that can rest against the seat 38 of the base part 10. The head 60 may have a coronal internally threaded portion 62. Upon tightening the abutment screw 56, the base part 10 can be firmly attached to the dental implant 40 and the matching surfaces 32 and 54 and can create an effective and tight seal.

As also seen in FIG. 2A a, the height H of the outer surface 28 of the base part 10 may correspond to the height of soft tissue 64 adjacent the installed bone level dental implant 38.

Figure 2C:
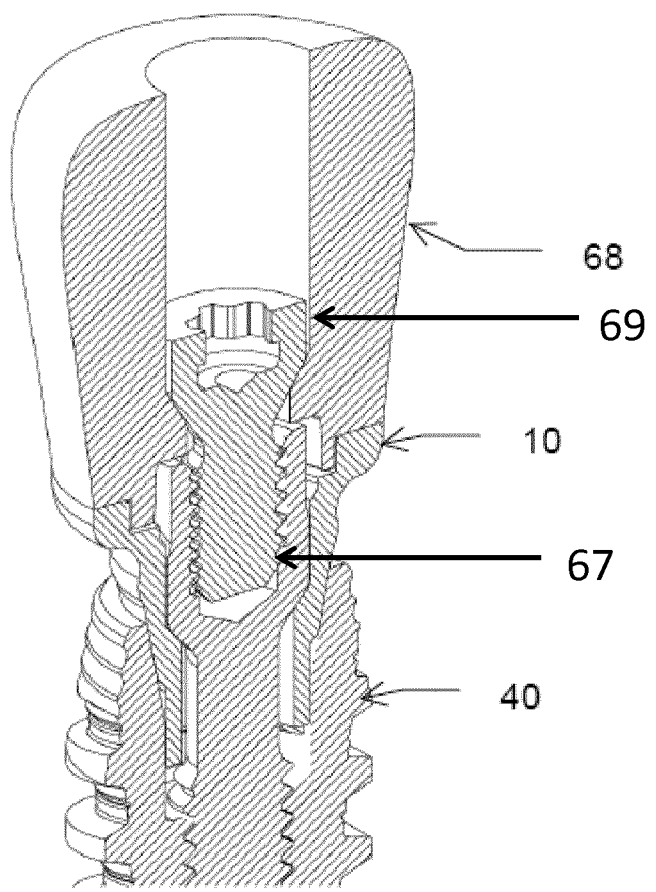
FIG. 2C is a cross-sectional perspective of the base part and the dental implant of FIG. 2A coupled together with a screw-retained final restoration.
Figure 2D:
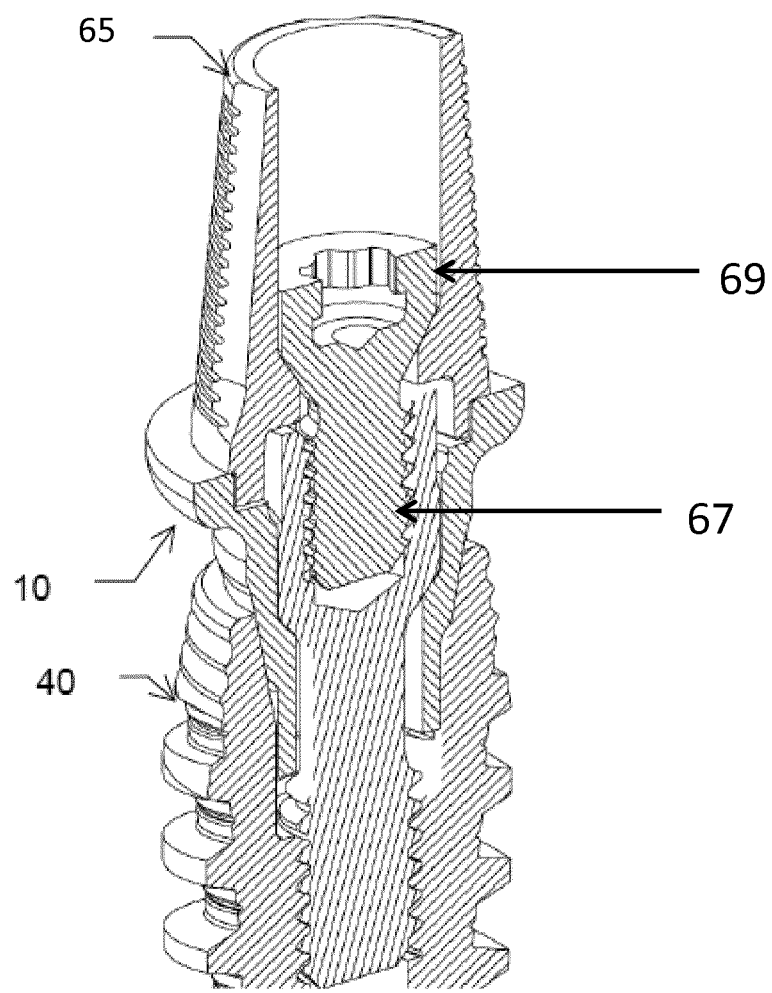
FIG. 2D is a cross-sectional perspective the base part and the dental implant of FIG. 2A coupled together with a final abutment which can support a cement-retained final restoration.
Figure 2E:
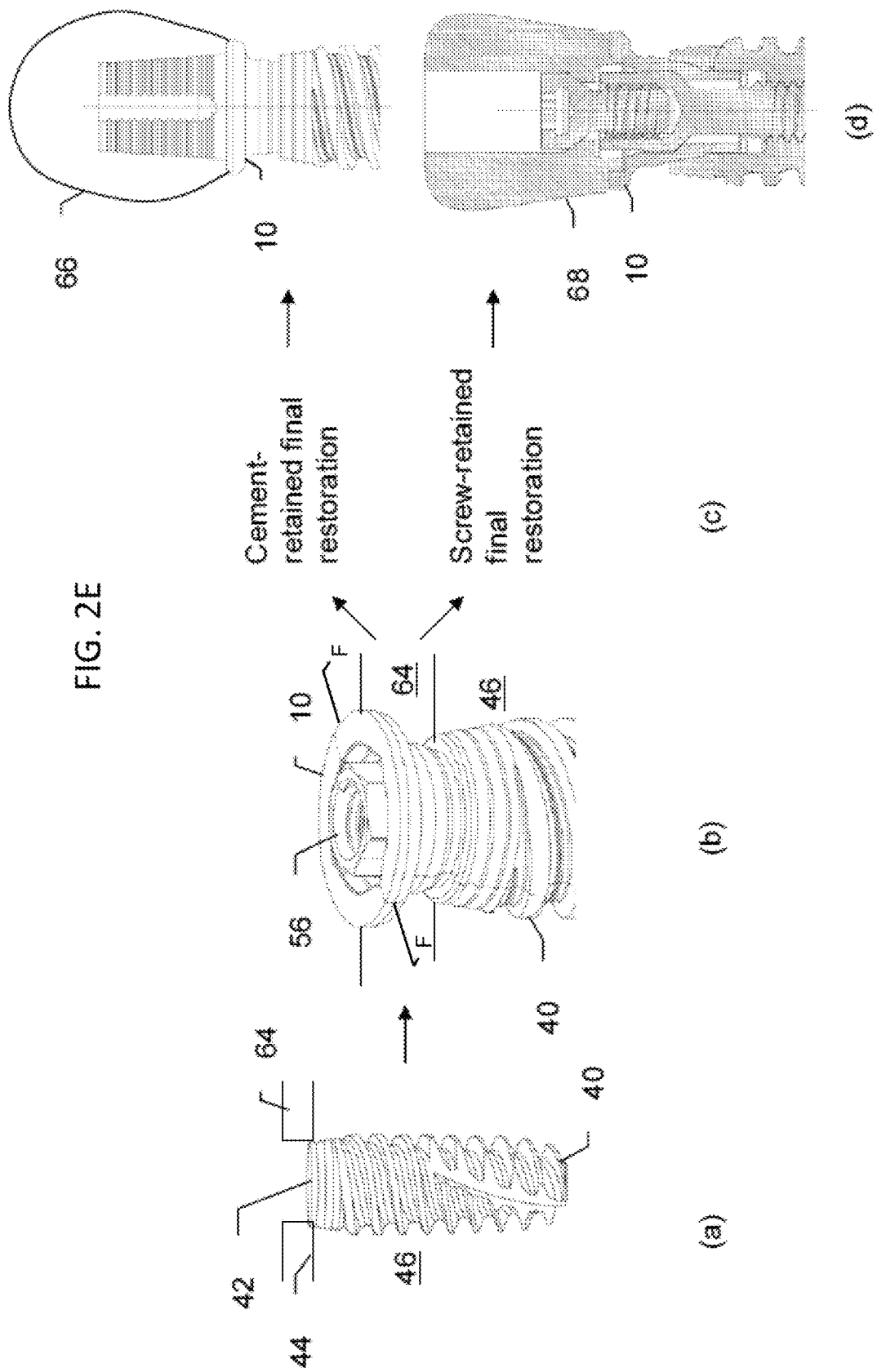
FIG. 2E is a flow chart of methods of using the base part of FIG. 2A with a screw-retained final restoration or a cement-retained final restoration according to one embodiment.

The abutment system 12 can be used to support a final restoration (e.g., a cement-retained final restoration 66 as shown in FIG. 2E and/or a screw-retained final restoration 68 as shown in FIG. 2C and which are described in U.S. Publication No. 2014/0011160, the entirety of which is hereby incorporated herein) as well as a healing cap as described below with respect to FIG. 3A-9. In other words, either of a final restoration (cement 66 or screw retained 68) or a healing cap can be supported using the same base part 10, 10'. Also, the abutment system 12 can support other screw-retained prosthetic components, such as a cover screw, a bar, etc. and other cement retained prosthetic components. The abutment system 12 could also be regarded as a two-piece soft tissue level dental implant, wherein the two pieces are the (bone level) dental implant 40 and the (soft tissue level) abutment part 10, 10'. As shown in FIG. 2C, in the illustrated embodiment the screw-retained final restoration 68 can be coupled to the base part 10 by a screw 69 that has an apical external threaded portion 67 for engaging the internally threaded portion 62 of the abutment screw 56. In the illustrated arrangement, the screw 69 can have a head that rests against a seat within an internal bore of the screw-retained final restoration 68 to secure the screw-retained final restoration 68 to the base part 10. As shown in FIG. 2D, the cement-retained final restoration 66 can be supported by a final abutment 65 that can also be coupled to the base part by the screw 69 that has the apical external threaded portion 67 for engaging the internally threaded portion 62 of the abutment screw 56. The final abutment 65 can include grooves and/or ridges (see FIG. 2D) for retaining cement to for securing the final restoration 66 to the final abutment 65.

With reference to FIG. 2E, in one embodiment of use, the bone level dental implant 40 can be installed (a) by a surgeon in the jawbone 46 of a patient in a manner known per se. The dental implant 40 can be installed such that the coronal end 42 of the dental implant 40 is substantially in level with the upper edge 44 of the jawbone 46. Then, after installation, the base part 10 is attached (b) to the dental implant 40 by the surgeon by the abutment screw 56. This base part 10 will normally not be removed after it has been attached to the implant 40. The outer surface 28 is here exposed to soft tissue 64. The base part 10 may be attached to the dental implant 40 immediately after the dental implant 40 has been installed. As will be described below, in one embodiment of use, a healing cap can be coupled to the base part 10 and can remain coupled to the base part during a healing period. A prosthodontist, which typically is not the same person as the surgeon, can remove the healing cap from the base part is thereafter free to decide or select (c) which one of a cement-retained final restoration 66 and a screw-retained final restoration 68 that should be used.

In FIG. 3A-E illustrates an embodiment of a healing cap 72 that can be used with the abutment system 12 described above and in particular the base part 10' of FIG. 1C-E, which includes an index portion 25' with six protrusions. The healing cap 72 can be configured to be attached to the base part 10' via a further screw 74 (see FIG. 4A-B). The further screw 74 may also be comprised in the abutment system 12. While the healing cap of FIG. 3A-E is configured to mate with the base part 10' described above with respect to FIG. 1C-E in modified embodiments the healing cap 72 can be configured to mate with a base part 10' that has a different configuration (e.g., a differently shaped indexing shape such as base part 10 of FIG. 1A-B and/or external surface) and/or directly to a dental implant or to another intermediate component. That is, certain features of the healing cap 72 are not limited to being used in combination with the base part 10' although as described below the combination of the healing cap with the base part 10' has certain advantages. For example, the base part 10' can remain in the patient during a healing phase and form part of a final restoration and thus need not be removed after being installed. An advantage of this arrangement is that disturbance of the soft tissue surrounding the base part 10' is reduced.

Figures 4A, 4B:
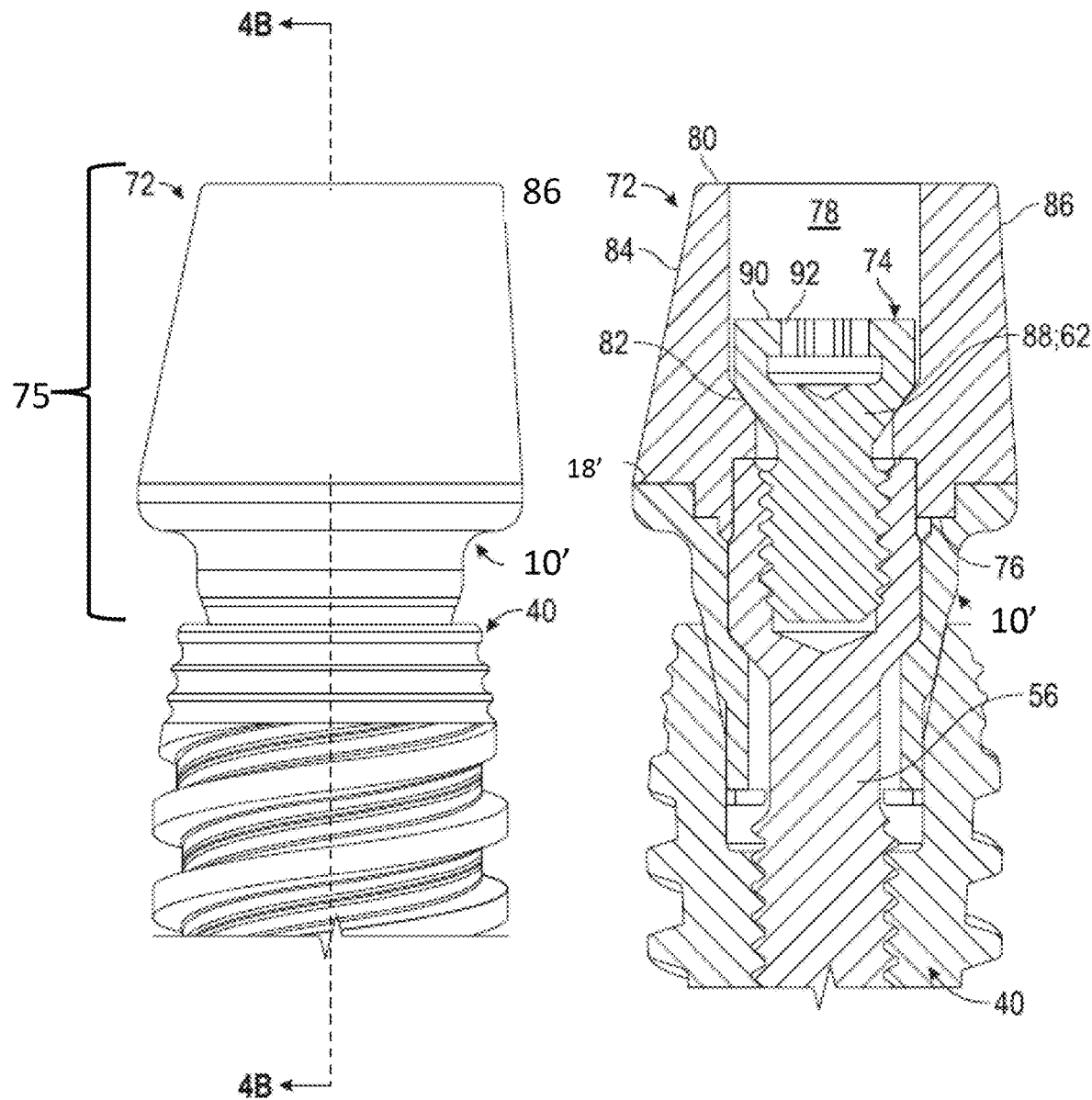
FIG. 4A is a side view of the base part of FIG. 1C and dental implant of FIG. 2A together with the healing cap of FIG. 3A.
FIG. 4B is a cross-sectional side view of the arrangement in FIG. 4A taken through line 4B-4B.
Figure 5A:
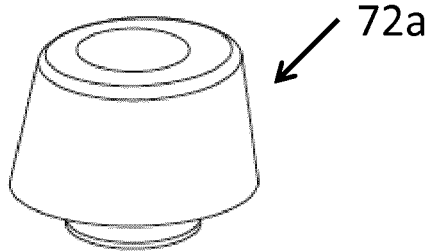
FIGS. 5A and 5B is side perspective view and a top view of a healing cap of a first configuration.
Figure 5B:
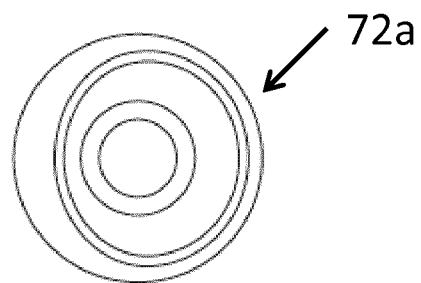
Figure 5C:
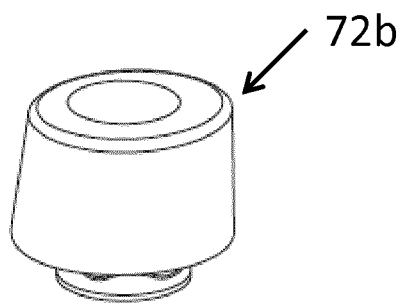
FIGS. 5C and 5D is side perspective view and a top view of one embodiment of a healing cap of a second configuration.
Figure 5D:
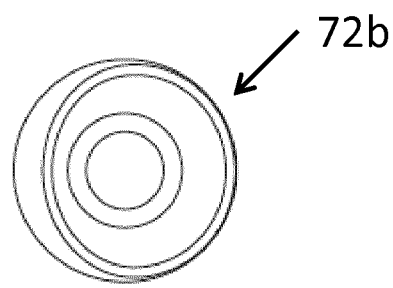
Figure 5E:
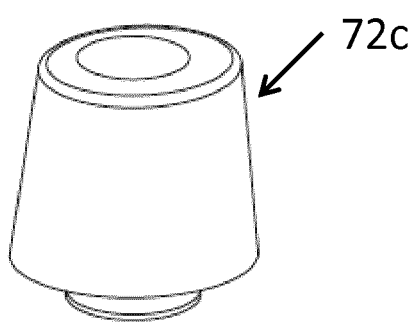
FIGS. 5E and 5F is side perspective view and a top view of one embodiment of a healing cap of a third configuration.
Figure 5F:
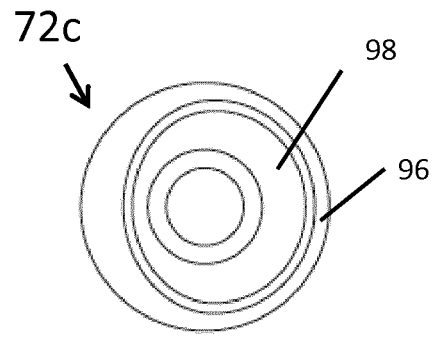
Figure 5G:
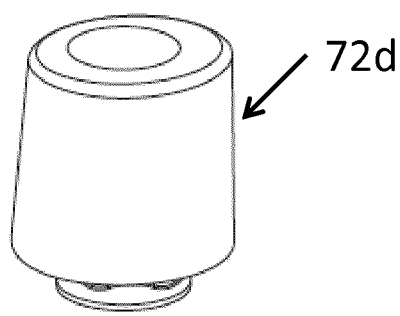
FIGS. 5G and 5H is side perspective view and a top view of one embodiment of a healing cap of a fourth configuration.
Figure 5H:
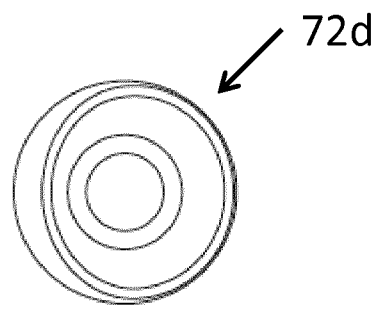
Figure 7A:
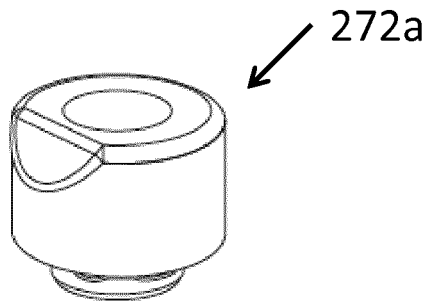
FIGS. 7A and 7B is side perspective view and a top view of a healing cap of a first configuration.
Figure 7B:
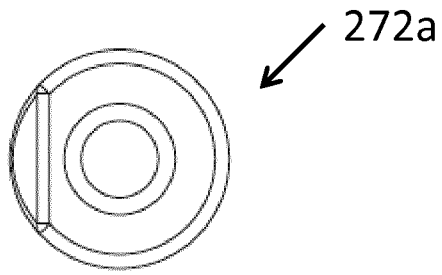
Figure 7C:
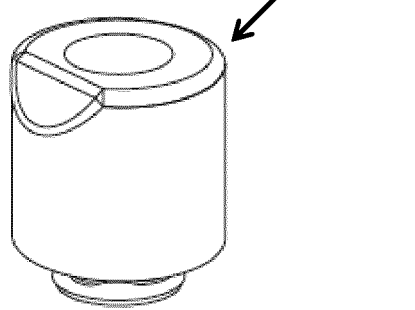
FIGS. 7C and 7D is side perspective view and a top view of one embodiment of a healing cap of a second configuration.
Figure 7D:
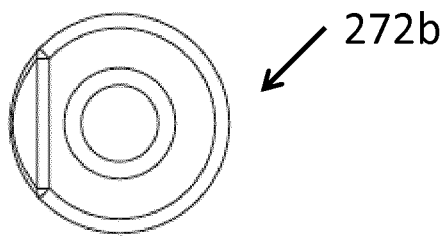
Figure 7E:
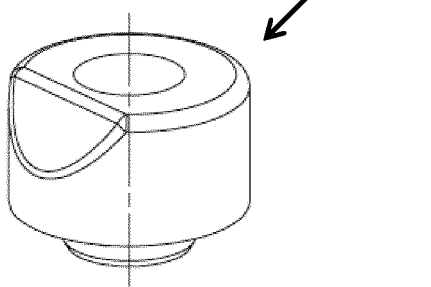
FIGS. 7E and 7F is side perspective view and a top view of one embodiment of a healing cap of a third configuration.
Figure 7F:
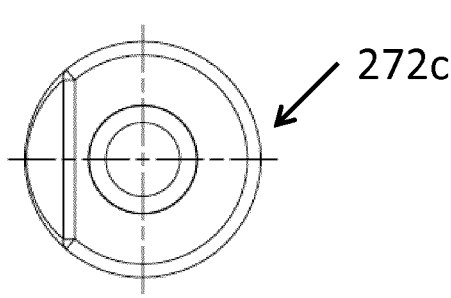
Figure 7G:
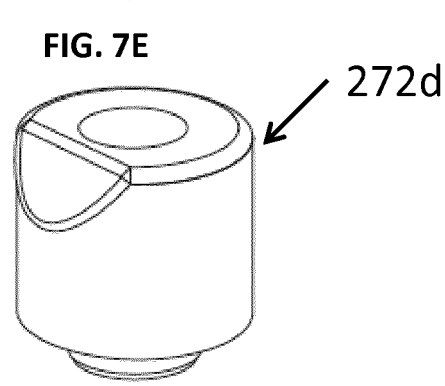
FIGS. 7G and 7H is side perspective view and a top view of one embodiment of a healing cap of a fourth configuration.
Figure 7H:
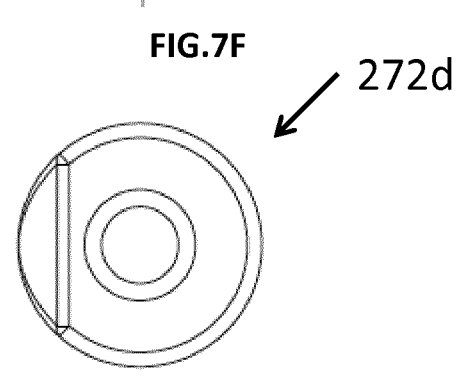

The healing cap 72 can have an apical end 76 at least partly matching the coronal end 14 of the base part 10, as seen in FIGS. 4A and 4B, such that an effective seal between the base part 10' and healing cap 72 can be achieved. The healing cap part 72 can further comprise an internal bore 78 extending between its coronal end 80 and the apical end 76. In the internal bore 78, there is a seat 82. The apical end 76 can thus have an index portion 77 that corresponds to the index portion 25' of the base part 10'. Thus, in the illustrated arrangement, the index portion 77 can include six protrusions 79a, 79b, 79c, 79d, 79e, 79f that correspond to the six concave lobes 22'a-f. The six protrusions 79a-f can be space equally about a cylindrical post 63 that matches the inner circular perimeter 20 of the base part 10, 10'. As noted above, the apical end 76 can have other configurations depending upon the configuration of the index portion 25, 25' of the base part 10, 10' given the goal of preventing rotation between the two components. In other embodiments, the apical end 76 can be formed without an index portion 77 in embodiments that do not require rotation to be prevented and/or indexing between the two parts.

In use, the healing cap part 72 can be attached to the base part 10 by mean of a further screw 74 (see FIG. 4A-B). The further screw 74 can have an apical external threaded portion 88 for engaging the internally threaded portion 62 of the abutment screw 56. Also, the further screw 74 can have a head 90 that rests against the seat 82 of the healing cap 72. The head 90 may have a coronal tool socket 92. Upon tightening the further screw 74, the healing cap 72 is firmly attached to the base part 10. As mentioned above, in such an arrangement, the base part 10' and healing cap 72 can form a healing abutment system 75, which can be regarded a two-piece healing abutment, wherein the two pieces are the base part 10' and the healing cap 75.

With reference to FIG. 3D, the coronal end of the healing cap 72 has an external side surface 86 that can be adapted to guide soft tissue growth during a healing period and/or extend above the gum tissue depending upon the patient's anatomy. Accordingly, in certain arrangements, the external surface 86 can have a contour similar to the gingival portion of the natural tooth being replaced. Accordingly, the external side surface can have a height H measured along a longitudinal axis of the healing abutment 72, which corresponds to the height H of the healing abutment 72 when it is placed on the base part 10, 10' and a lower surface 71 of the coronal end 80 contacts the top surface 18, 18' of the base part 10, 10'. The external surface can taper from smaller top diameter Dt at a coronal end 80 of the healing cap 72 to a larger base diameter Db at the lower end of the coronal end 80 and above the apical portion 76 that can generally correspond the coronal diameter D1, D1' of the top surface 18, 18' of the base part 10, 10'. As will be explained below, a coronal end 80 of the healing cap 72 also has a shape that can be used to convey information about the healing cap 72, base part 10 and/or the dental implant 40.

With reference to FIGS. 3C and 3E, the coronal end forms a top surface 98 of the healing cap 72. The top surface 98 can have an edge 96 that forms an asymmetric shape. With reference to FIG. 3C, the asymmetrical shape formed by the edge 96 can comprise a first portion 104 with a crescent shape joined to a more circular a second portion 106. In the illustrated embodiment, the edge 96 defines a shape having length L1 in a first or x direction and length L2 in a second or y direction which forms an aspect ratio L1/L2 that less than 1 in the illustrated embodiment. In other embodiments the aspect ratio L1/L2 can be greater than 1. In the illustrated embodiment, the asymmetrical shape is a generally oval or rounded shape however in modified embodiments the top surface 98 can form different asymmetrical shapes can be used such as trapezoids. In the illustrated embodiment, the top surface 98 can be planar and perpendicular to the longitudinal axis of the healing cap 72. In modified arrangements, the top surface 98 can form an angle with respect to the longitudinal axis of the healing cap 72 and/or be formed my one or more curved and/or flat surfaces.

The edge 96 of the top surface, for example when viewed in a longitudinal cross section, can be a beveled or rounded edge. In other words, the surface 96 joining or bridging the top surface 98 and the external side can be beveled or rounded or without sharp edge. This rounded or beveled shape avoids any sharp edges and is beneficial for the patient comfort as it avoids potential injuries of the soft tissue. This shape also helps streamlining the clinical workflow as the clinician does not have to manually smoothen any sharp edge.

Furthermore, a healing cap of the prior art with a sharp angle needs to be modified at the time of its placement as a sharp edge should not be left in the patient's mouth. Therefore, the sharp edge needs to be modified at placement time. For this reason, the scan is done at placement time before removal of the sharp edge. However, this scan, realized before the healing process, does not reflect the oral situation of the patient after the healing process which can take several months and is therefore not accurate. The healing cap of the present invention having the beveled or rounded edge above described solves these problems. The beveled or rounded edge can be used in all embodiments of the present invention as can be seen on the different drawings.

As will be described below, the asymmetric shape of the top surface 98 of the healing cap 72 can be used to determine the orientation and position of the top surface 16, 16' and/or indexing portion 25, 25' of the base part 10, 10' within the patient. For example, in one embodiment, an intra-oral scanning system 350 (see FIG. 11) can capture the image of the top surface 98 of the healing cap 72 and the surrounding structure of the patient's anatomy (e.g., adjacent teeth, gum tissues and/or implants or abutments). This information can be transferred to an analysis system 310. The analysis system 310 can utilize shape matching to identify the orientation and position of the healing cap 72 with respect to the patient's anatomy. In such an arrangement, the top surface 98 can be used to calculate the longitudinal center axis of the healing cap 72 and thus the longitudinal center axis of the base part 10, 10' upon which the healing cap 72 is mounted. The top surface 98 can also be used to determine the position in space of the healing cap 72. If the size and shape of the healing cap 72 is known, a vector for the position and orientation of the top surface 16, 16' and/or indexing portion 25, 25' can be determined from the position and orientation of the top surface 98 of the healing cap 72.

In one arrangement, the type of healing cap 72 can be entered into the analysis system 310 by a user 340 through an input device 330 (e.g., a computer key board or mouse), which can provide the analysis system 310 with information regarding the physical structure (e.g., height and diameter of the healing cap). As noted above, the known physical structure of the healing cap 72 can be combined with the position and orientation of the top surface 98 to determine the orientation and position of the top surface 16, 16' of the base part 10 including the orientation of the indexing region. In this manner, the user 340 of the analysis system 310 can design a final restoration 370 that can mate accurately with the base part 10. In certain arrangements, the user 340 can view the final restoration on a computer screen 320 or similar device and/or plan and design the final restoration using the computer screen 330. Production data 355 regarding the shape and construction of the final restoration can be sent to a production facility 360. The production facility 360 can produce the final restoration 370 according to the production data.

In addition to or alternatively, in certain embodiments, the shape of the top surface 98 can also be used to identify of physical characteristic of the healing cap 72 such as the height of the healing cap 72 or the diameter of the healing cap 72. That is, in certain arrangements, the analysis system 310 can match the shape of the top surface 98 against a stored library of top surface shapes of healing caps and in this manner the analysis system 310 can determine the type of healing cap that has been scanned by the scanning system 300. The analysis system 310 can then determine automatically the physical characteristics of the healing cap (e.g., height, diameter and/or type of healing cap), which can be used in combination with the orientation and position of the top surface of the healing cap 72 to determine the orientation and position of the top surface 18, 18' of the base part 10, 10' and/or the orientation of the index portion 25, 25'. In another embodiment, the analysis system 310 instead of or in addition to matching the surface of the top surface 98 against a stored library of healing caps can calculate the aspect ratio L1/L2 of the top surface 98 and/or another characteristic of the top surface 98 (e.g., area, width length, shape) which can be compared to a library list of aspect ratios which can be used to determine identify the physical characterizes of the healing cap that was scanned.

In addition to or alternatively, in certain embodiments, the shape of the top surface 98 can be used to identify characteristics of the base part 10 such as the indexing portion 25, 25' of the base part 10, 10' (as mentioned above), the height of the base part 10, 10', the diameter of the base part 10, 10' and/or the type of base part 10, 10'. In addition to or alternatively, in certain embodiments, the shape can also identify characteristics of the dental implant 40 including the type of dental implant 40, the diameter of the dental implant 40 and the angular orientation and/or position of the dental implant 40 in the patient.

An advantage of the healing cap 72 is that the healing cap does not need to include information markers in order to transmit information about the position and orientation of the healing cap 72 and/or physical characteristics about the healing cap 72. That is, instead of information markers added to the healing cap 72, information regarding the position and orientation of the healing cap 72 and/or the physical characteristics of the healing cap 72 can be derived from the shape of the top surface 82 by surface matching the shape and/or using the aspect ratio of the shape (or other derived characteristic of the shape) to determine such information.

FIGS. 5A-5H illustrate a set of four different healing caps 72a, 72b, 72c, 72e that are configured as described above with respect to FIG. 3A-E but having different heights and diameters. FIGS. 5A-B and FIG. 5C-D illustrate healing caps 72, 72b having different base diameters Db for mating with base parts 10, 10' having different coronal diameters D1, D1 but having the same healing cap height H. FIG. 5E-F and FIG. 5G-H illustrate healing caps 72c, 72d having different base diameters for mating with base parts 10, 10' having different coronal diameters D1, D1 but having the same healing abutment height H. The healing caps 72c, 72d of FIG. 5E-F and FIG. 5G-H can have larger height H as compared to the healing caps 72a, 27b of FIG. 5A-B and FIG. 5C-D. In the illustrated embodiments, the healing cap 72a of FIG. 5A-B has the same base diameter Db as the healing cap 72c of FIG. 5E-F and the healing cap 72b of FIG. 5C-D have the same base diameter Db as the healing cap 72d of FIG. 5G-H. In one arrangement, the dental practitioner can be provided with a set of healing caps having different base diameters Db and different heights H. The healing caps of different base diameters Db can be configured to connect to base parts 10, 10' of different coronal diameters D1, D1 and healing caps of different heights H can be used in situations of different patient plans and/or as desired by the dental practitioner.

As shown in FIG. 5A-H, in the illustrated embodiment, the shape of the edge 96 of the top surfaces 98 across the sizes of illustrated healing caps 72a-d are substantially the same. As noted above, the analysis system 310 can utilize shape matching to identify the orientation and position of the healing cap 72 with respect to the patient's anatomy. In one arrangement, the type of abutment 72 can be entered into the analysis system (e.g., by a user 340 of the system 310), which provides the analysis system 310 with information regarding the physical characteristics (e.g., height and diameter of the healing cap). The known characteristics of the healing cap 72 can be combined with measured the position and orientation of the top surface 98 to determine the orientation and position of the top surface 18, 18' of the base part 10, 10' including the orientation of the index portion 25, 25'. In this manner, a user of the analysis system 310 can design a final restoration 370 that can mate accurately with the base part 10. The final restoration 370 can be screw-retained or cement retained as described above. In addition to or alternatively, in certain embodiments, the shape of the top surface 98 can also be used to identify a physical characteristic of the healing cap 72 such as the height H and/or base diameter Db of the healing cap 72. In such embodiments, the healing caps 72a-d of FIG. 5A-H can have top surfaces 98 of different shapes and/or different aspect ratios. The analysis system 310 can determine the shape and/or aspect ratio and use that information to determine the physical characteristics of the scanned healing cap 72a-d.

As noted above, the top surface 98 of the healing cap 72 can be planar and perpendicular to the longitudinal axis of the healing cap 72. FIG. 6A-E illustrate a modified embodiment of a healing cap 272 in which a top surface 298 includes a region 281 that does not extend perpendicular to the longitudinal axis of the healing cap 272.

The healing cap of FIG. 6A-E has certain features that are similar to the embodiment of FIG. 3A-B and thus similar features and components are labeled with the same reference numbers but with the number "2" added to the reference number (e.g., 276, 278, 282) and reference can be made to description above with reference to FIG. 3A-E. For example, the healing cap 272 can a have an apical end 276 at least partly matching the coronal end 14, 14' of the base part 10, 10 such that an effective seal between the base part 10, 10' and the healing cap 272 can be achieved. The healing cap 272 can also have an index portion 277 configured to engage the index portion 25, 25' of the base part 10, 10 and in the illustrated embodiment includes six protrusions 279a-f arranged equally about a cylindrical post 263. The healing cap 272 can further include an internal bore 278 extending between its coronal end 280 and the apical end 726. In the internal bore 278, there is a seat 282. In the illustrated embodiment, the healing cap 272 can have a side surface 285 that is substantially cylindrical such that the top diameter Dt is the same as the base diameter Db. The side surface 285 can have a height H defined along the longitudinal axis of the healing cap 272 which corresponds to the height of the healing cap 272 when it is placed on the base part 10, 10' and the lower surface 271 contacts the top surface 18, 18' of the base part 10, 10'.

As noted above, the shape of the top surface 298 of the healing cap 272 can be used to determine the underlying orientation and position the top surface 18 of the base part 10 within the patient. In addition to or alternatively, in certain embodiments, the shape of the top surface 298 can also be used to identify the physical characteristics of the healing cap 272 such as the height of the healing cap or the diameter of the healing cap 272.

FIG. 7A-7H illustrate a set of four different healing caps 272a, 272b, 272c, 272e that are configured as described above with respect to FIG. 6A-E but having different heights H and base diameters Db. FIG. 7A-B and FIG. 7C-D illustrate healing caps 272a, 272b having the same base diameters Db but having the different heights H (healing cap 272b being taller than healing cap 272a). FIG. 7E-F and FIG. 7G-H illustrate healing caps 272c, 272d having the same base diameters Db but having different heights (healing cap 272d being taller than healing cap 272c). In the illustrated embodiments, the healing caps of FIGS. 7E-H have a larger base diameter Db than the healing caps of FIG. 7A-D. The heights H of healing caps 272a and 272c can be the same and the heights of healing caps 272b and 272d can be the same. As noted above, in one arrangement, the dental practitioner can be provided with a set of healing caps having different base diameters Db and different heights H. The healing caps of different base diameters Db can be configured to connect to base parts 10, 10' of different diameters and healing caps of different heights H can be used in situations of different anatomies or as desired by the dental practitioner in light of the patient's anatomy.

As shown in FIG. 7A-H, in the illustrated embodiment, the shape of the edge of the top surfaces across the sizes of illustrated healing caps are substantially the same. As noted above, the analysis system 310 can utilize shape matching to identify the orientation and position of the healing cap with respect to the patient's anatomy. In one arrangement, the type of abutment can be entered into the analysis system (e.g., by a user of the system) which provides the analysis system with information regarding the physical structure (e.g., height and diameter of the healing cap). The known physical structure of the healing cap can be combined with the measured position and orientation of the top surface to determine the orientation and position of the top surface of the base part including the orientation of the indexing region. In this manner, a user of the analysis system can design a final restoration that can mate accurately with the base part. In addition to or alternatively, in certain embodiments, the asymmetric shape of the top surface can also be used to identify of characteristic of the healing cap such as the height of the healing cap or the diameter of the healing cap. In such embodiments, the healing caps of FIG. 7A-H can have top surfaces of different shapes and/or different aspect ratios. The analysis system can determine the shape and/or aspect ratio and use that information to determine the physical characteristics of the scanned healing cap.

FIG. 8A-8E illustrates another embodiment of a healing cap 372. The healing cap 372 of FIG. 8A-E has certain features similar to the embodiment of FIG. 3A-B and thus similar features and components are labeled with the same reference numbers but with the number "3" added to the reference number (e.g., 376, 378, 232) and reference can be made to description above with reference to FIG. 3A-E. For example, the healing cap 372 can include an apical end 376 at least partly matching the coronal end 14, 14' of the base part 10, 10' such that an effective seal between the base part 10, 10' and the healing cap 372 can be achieved. The healing cap 372 can also have an index portion 377 configured to engage the index portion 25, 25' of the base part 10, 10 and in the illustrated embodiment includes six protrusions 379a-f arranged equally about a cylindrical post 363. The healing cap 372 can further include an internal bore 378 extending between its coronal end 380 and the apical end 376. In the internal bore 378, there is a seat 282.

In the illustrated embodiment, the healing cap 272 can have a side surface 385 to aid in shaping of soft tissue. In the illustrated embodiment, the side surface 385 can have a substantially cylindrical coronal portion 385a having a diameter Dt and a length Hc as shown in FIGS. 8B and 8E. From the substantial cylindrical coronal portion 385a, the outer surface 385 can extends from the larger coronal diameter Dt to a smaller coronal diameter Db, first in a convex shape 385b and then in a concave shape 385c. Other configurations are possible in modified embodiments. For example, the outer surface 385 can comprise straight portions that are inclined in relation to each other. The convex shape 385b and then in the concave shape 385c can have a height Hd defined along the longitudinal axis of the healing cap 372 as shown in FIG. 8E. This height Hd in combination with the height Hc of the cylindrical portion 385a corresponds to the height H of the healing cap 372 when it is placed on the base part 10, 10' and the lower surface 371 contacts the top surface 18, 18' of the base part 10, 10'. The lower diameter Db of the healing cap 372 can correspond to the top diameter the top surface 18, 18' of the base part 10, 10'.

As noted above, the shape of the top surface 398 of the healing cap 372 can be used to determine the underlying orientation and position the top surface 18 of the base part 10 within the patient. In addition to or alternatively, in certain embodiments, the shape of the top surface 398 can also be used to identify the physical characteristics of the healing cap 372 such as the height of the healing cap or the diameter of the healing cap 372. As with the embodiment of FIGS. 6A-6E, the top surface 398 includes a region 381 that does not extend perpendicular to the longitudinal axis of the healing cap 372.

With reference to FIG. 8C, the edge 396 of an edge of the top surface 398 when viewed from the top can form a pair of flat sides 399a, 399b. As described above with respect to FIG. 3A-E, the flat sides 399a, 399b along with the region 381 can form an asymmetrical shape that can be used (e.g., via shape matching) as described herein for identifying the orientation of and position of the healing cap 372.

With continued reference to FIG. 8C, in the illustrated embodiment, the edge 396 can define a shape having length L1 in a first or x direction and length L2 in a second or y direction which forms an aspect ratio L1/L2 that less than 1 in the illustrated embodiment. In other embodiments the aspect ratio L1/L2 can be greater than 1. In another embodiment, the analysis system 310 instead of or in addition to matching the surface of the top surface 398 against a stored library of healing caps can calculate the aspect ratio L1/L2 of the top surface 398 and/or another characteristic of the top surface 398 (e.g., area, width length, shape) which can be compared to a library list of aspect ratios which can be used to determine or identify the physical characterizes of the healing cap that was scanned.

As in the embodiments described above, the healing cap 372 can form part of a set in which the healing cap 372 can have different base diameters Db and/or heights H. FIGS. 9A-9E illustrate another embodiment of a healing cap 472. The healing cap 472 of FIG. 9A-E has certain features similar to the embodiment of FIG. 8A-E and thus similar features and components are labeled with the same reference numbers but with the number "4" added to the reference number (e.g., 476, 478, 432) and reference can be made to description above. As shown in FIGS. 9A-9E, in this embodiment, the cylindrical portion 485a of the healing cap 472 has a height Hc that is greater than the height Hc of the embodiment of FIGS. 8A-8E. In other embodiments, the diameter Db of the base can be varied to mate with base parts 10, 10' having different diameters. Depending on the patient oral situation or on other parameters, the height H can vary between 3 and 6.5 mm.

Figures 13A, 13B, 13C, 13D, 13E:
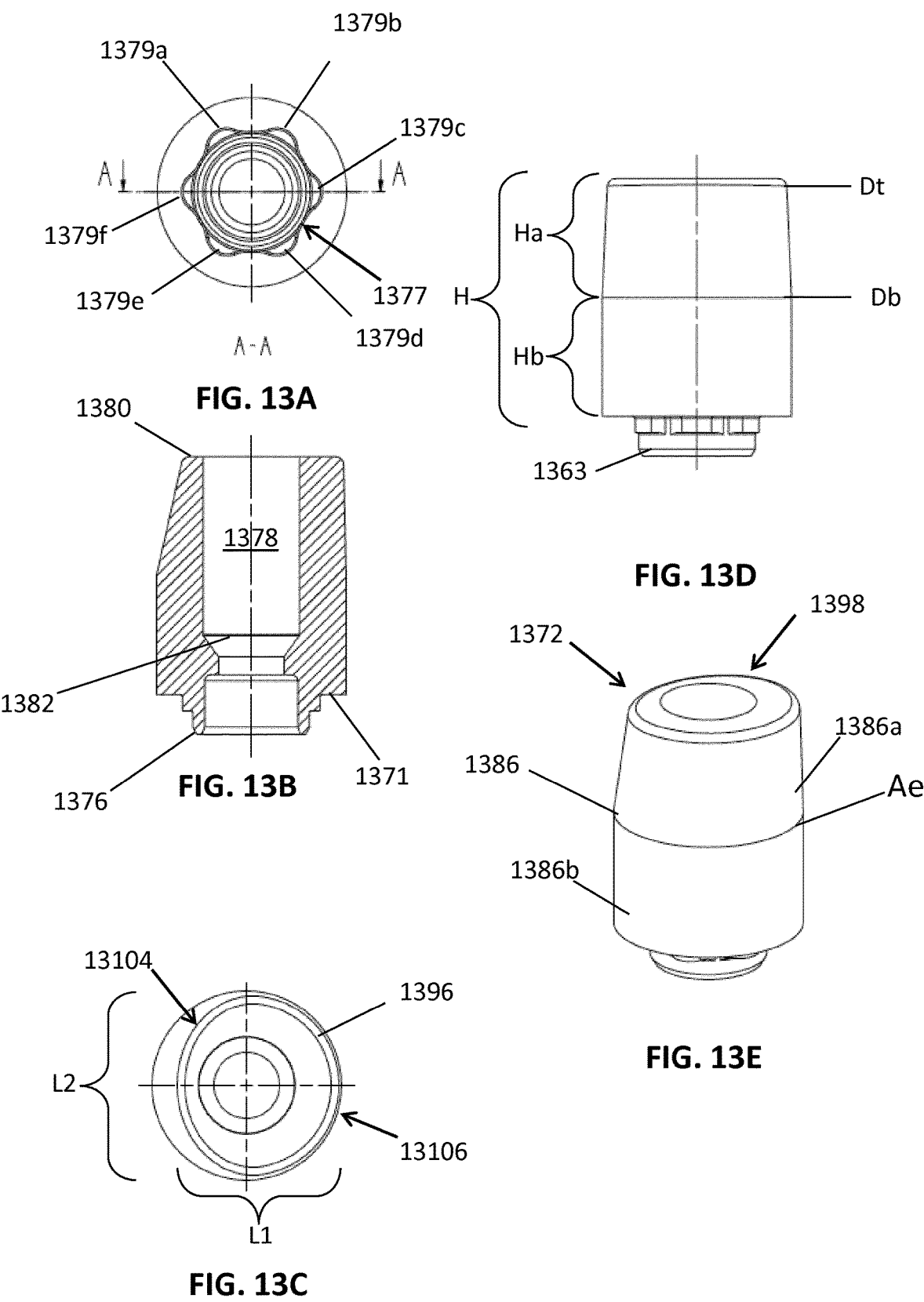
FIG. 13A is a bottom view of a healing cap according to one embodiment.
FIG. 13B is a cross-sectional side view of the healing cap of FIG. 3A taken through line A-A of FIG. 13A.
FIG. 13C is a top view of the healing cap of FIG. 13A.
FIG. 13D is a side view of the healing cap of FIG. 13A.
FIG. 13E is a side perspective view of the healing cap of FIG. 13A.
Figure 14A:
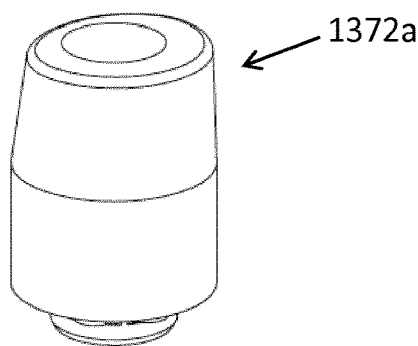
FIGS. 14A and 14B is side perspective view and a top view of a healing cap of a first configuration.
Figure 14B:
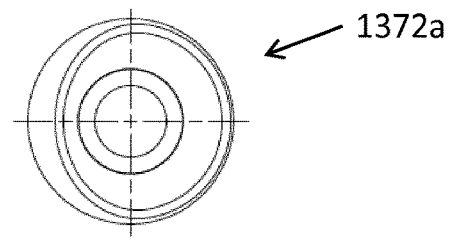
Figure 14C:
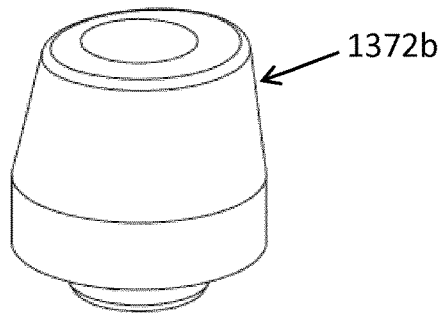
FIGS. 14C and 14D is side perspective view and a top view of one embodiment of a healing cap of a second configuration.
Figure 14D:
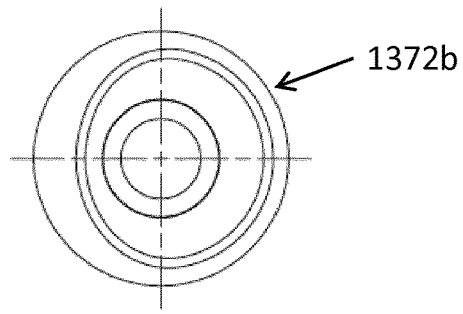
Figure 14E:
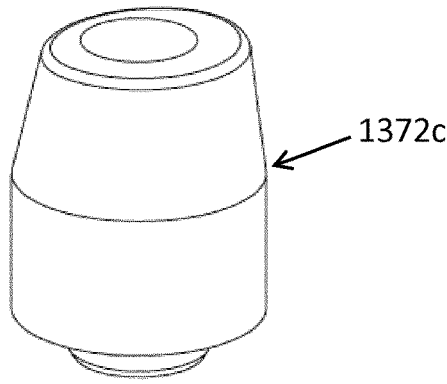
FIGS. 14E and 14F is side perspective view and a top view of one embodiment of a healing cap of a third configuration.
Figure 14F:
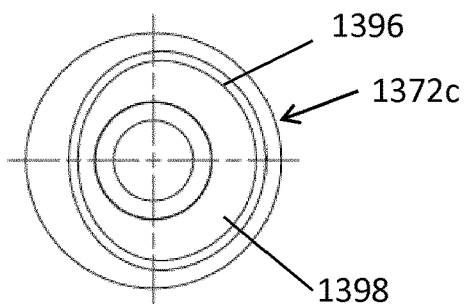
Figure 14G:
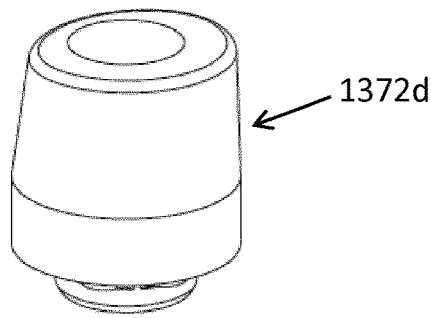
FIGS. 14G and 14H is side perspective view and a top view of one embodiment of a healing cap of a fourth configuration.
Figure 14H:
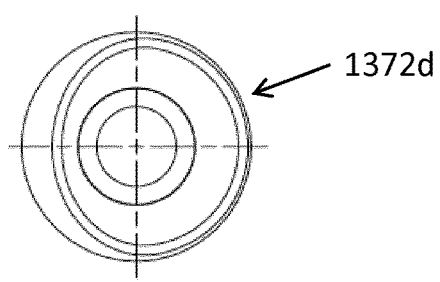

FIG. 13 illustrates another embodiment of a healing cap 1372 according to the invention. The healing cap 1372 cap of FIGS. 13-15B has certain features similar to the embodiment of FIG. 3A-E and thus similar features and components are labeled with the same reference numbers but with the number "13" added to the reference number (e.g., 1376, 1378, 1332) and reference can be made to description above. For example, the healing cap 1372 can have an apical end 1376 at least partly matching the coronal end 14, 14' of the base part 10, 10 such that an effective seal between the base part 10, 10' and the healing cap 272 can be achieved. The healing cap 1372 can also have an index portion 1377 configured to engage the index portion 25, 25' of the base part 10, 10 and in the illustrated embodiment includes six protrusions 1379a-f arranged equally about a cylindrical post 1363. The healing cap 1372 can further include an internal bore 1378 extending between its coronal end 1380 and the apical end 1326. In the internal bore 1378, there is a seat 1382.

The main difference between the embodiment of FIG. 3 and the embodiment of FIG. 13 is that the healing cap 1372 has an external side surface 1386 comprising at least two portions 1386a/1386b with a respective heights Ha and Hb defined along the longitudinal axis of the healing cap 1372. The first external portion can have a general shape similar to the external surface 86 shown in FIG. 3. The second portion, having a cylindrical shape, extends apically from an apical end "Ae" of the first portion until a lower surface 1371. In other words, the external surface can taper apically, along the longitudinal axis of the healing cap, from a smaller top diameter Dt at a coronal end 1380 of the healing cap 72 to a larger base diameter Db and then extend further apically with a substantially cylindrical shape having the same diameter Db until a lower surface 1371. This geometry is to support soft tissue management and shaping. It aids in removal and replacement of the healing cap, and reduces the likelihood of soft tissue getting trapped between the base part 10, 10' and prosthetic restoration when the final restoration is placed.

The side surface 1386 can have a height H defined along the longitudinal axis of the healing cap 1372 which corresponds to the the height of the healing cap 1372 when it is placed on the base part 10, 10' and the lower surface 1371 contacts the top surface 18, 18' of the base part 10, 10'.

As noted above, the shape of the top surface 1398 of the healing cap 1372 can be used to determine the underlying orientation and position the top surface 18 of the base part 10 within the patient. In addition to or alternatively, in certain embodiments, the shape of the top surface 1398 can also be used to identify the physical characteristics of the healing cap 1372 such as the height of the healing cap or the diameter of the healing cap 1372.

Figure 15B:
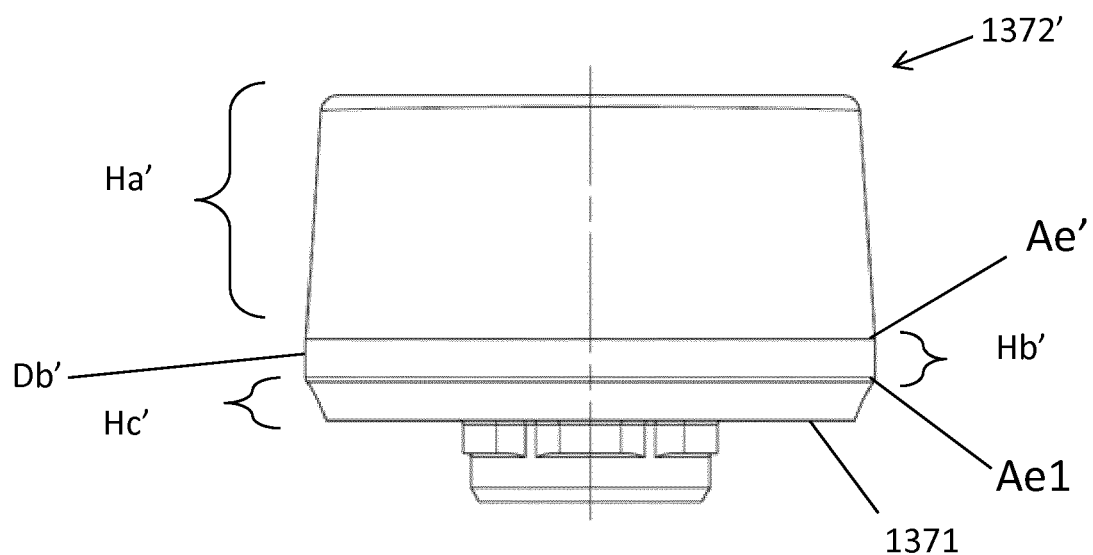
FIG. 15B is a side view of the healing cap of FIG. 15A with a different scale.
Figure 15A:
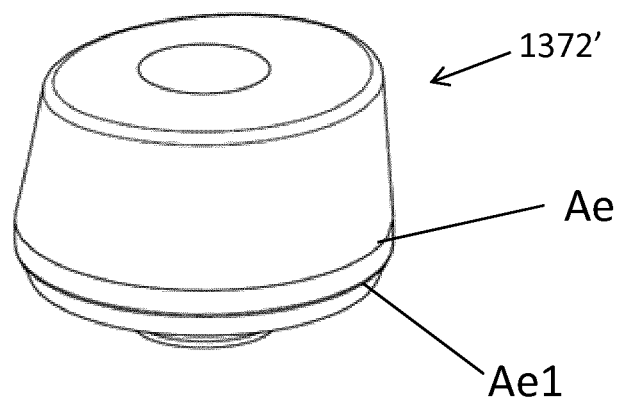
FIG. 15A is a side perspective view of a healing cap according to the invention.

FIG. 15 illustrate another embodiment of a healing cap 1372' according to the invention. In this embodiment the healing cap 1372' can comprise at least three portions with a respective heights Ha',Hb', and Hc' defined along the longitudinal axis of the healing cap 1372'. The first external portion can have a general shape similar to the external surface 86 shown in FIG. 3. The second portion, having a cylindrical shape, can extend apically from an apical end "Ae'" of the first portion until and apical end "Ae1" of the second portion. The diameter Db' of the second portion can be larger than the diameter D1,D1' of the upper portion of the base part 10,10 with which it is intended to cooperate. The third portion can extend from the apical end Ac1 of the second portion until a lower surface 1371'. The third portion can taper down from said apical end Ae1 of the second portion with the same diameter Db' until a diameter D1 or D1' of the base part 10 or 10'. The third portion can have a frustoconical shape. This geometry is to support soft tissue management and shaping. It aids in removal and replacement of the healing cap, and reduces the likelihood of soft tissue getting trapped between the base part 10, 10' and prosthetic restoration when the final restoration is placed.

FIGS. 14A-14H illustrate a set of four different healing caps 1372a, 1372b, 1372c, 1372e that are configured as described above with respect to FIG. 3A-E but having different heights H, Ha, Hb and base diameters Db. FIG. 14A-B and FIG. 14G-H illustrate healing caps 1372a, 1372b having the same base diameters Db but having the different heights H (healing cap 1372a being taller than healing cap 1372d). FIG. 14C-D and FIG. 14E-F illustrate healing caps 1372b, 1372c having the same base diameters Db. but having different heights (healing cap 1472c being taller than healing cap 1472b). In the illustrated embodiments, the healing caps of FIG. 14C-F have a larger base diameter Db than the healing caps of FIGS. 14A-B, 14G-H. The heights H of healing caps 1372a and 1372c can be the same and the heights of healing caps 272b and 272d can be the same. As noted above, in one arrangement, the dental practitioner can be provided with a set of healing caps having different base diameters Db and different heights H, Ha, Hb. The healing caps of different base diameters Db can be configured to connect to base parts 10, 10' of different diameters and healing caps of different heights H,Ha,Hb can be used in situations of different anatomies or as desired by the dental practitioner in light of the patient's anatomy.

As shown in FIG. 14A-H, in the illustrated embodiment, the shape of the edge of the top surfaces across the sizes of illustrated healing caps are substantially the same. As noted above, the analysis system 310 can utilize shape matching to identify the orientation and position of the healing cap with respect to the patient's anatomy. In one arrangement, the type of abutment can be entered into the analysis system (e.g., by a user of the system) which provides the analysis system with information regarding the physical structure (e.g., height and diameter of the healing cap). The known physical structure of the healing cap can be combined with the measured position and orientation of the top surface to determine the orientation and position of the top surface of the base part including the orientation of the indexing region. In this manner, a user of the analysis system can design a final restoration that can mate accurately with the base part. In addition to or alternatively, in certain embodiments, the asymmetric shape of the top surface can also be used to identify of characteristic of the healing cap such as the height of the healing cap or the diameter of the healing cap. In such embodiments, the healing caps of FIG. 14A-H can have top surfaces of different shapes and/or different aspect ratios. The analysis system can determine the shape and/or aspect ratio and use that information to determine the physical characteristics of the scanned healing cap.

With reference back to FIG. 11, the analysis system 310 can comprise one or more computers that can be coupled to one or more displays 320, one or more input devices 330, and one or more scanners 350, such as an intra-oral scanner. The user or operator 340, who may be a dentist, dental technician, or other person, may plan the data for dental prosthetics analysis system by manipulating the one or more input devices 330, which may be a keyboard and/or a mouse. In some embodiments, while working on a design for final restoration, the operator 340 can see a plan for the final restoration on the display 320. In modified embodiments, the scanner can be a scanner (e.g., a table top scanner) configured to scan an impression or a stone plaster analogue in embodiments (described below) in which a physical impression is take of the healing cap 72, 272.

In various embodiments, the analysis system 310 may include one or more computers with one or more processors, one or more memories, and/or one or more communication mechanisms. In some embodiments, more than one computer may be used to execute the modules, methods, and processes discussed herein. Additionally, the modules and processes herein may each run on one or multiple processors, on one or more computers; or the modules herein may run on dedicated hardware. The input devices 330 may include one or more keyboards (one-handed or two-handed), mice, touch screens, voice commands and associated hardware, gesture recognition, or any other means of providing communication between the operator 340 and the computer.

The display 320 may be a 2D or 3D display and may be based on any technology, such as LCD, CRT, plasma, projection, et cetera. The scanner 350 may be a 2D or 3D scanner. The scanner 350 can be an intra-oral scanner or another type of scanner (e.g., scanners that are not configured to take intra-oral scans). In some embodiments, 3D scanning in scanner 350 is accomplished using time-of-flight calculations, triangulation, conoscopic holography, structured light, modulated light, computed tomography, microtomography, magnetic resonance imaging, or any appropriate technology or technique. In some embodiments, 3D scanner may use x-rays, visible light, laser light, ultrasound radiation, or any other appropriate radiation or technology. In some embodiments, the 3D scanner may use stereoscopy, photometry, silhouetting, touch probe, or any other appropriate technique. In a preferred embodiment, the scanner 350 is an intra-oral scanner.

Figure 11:
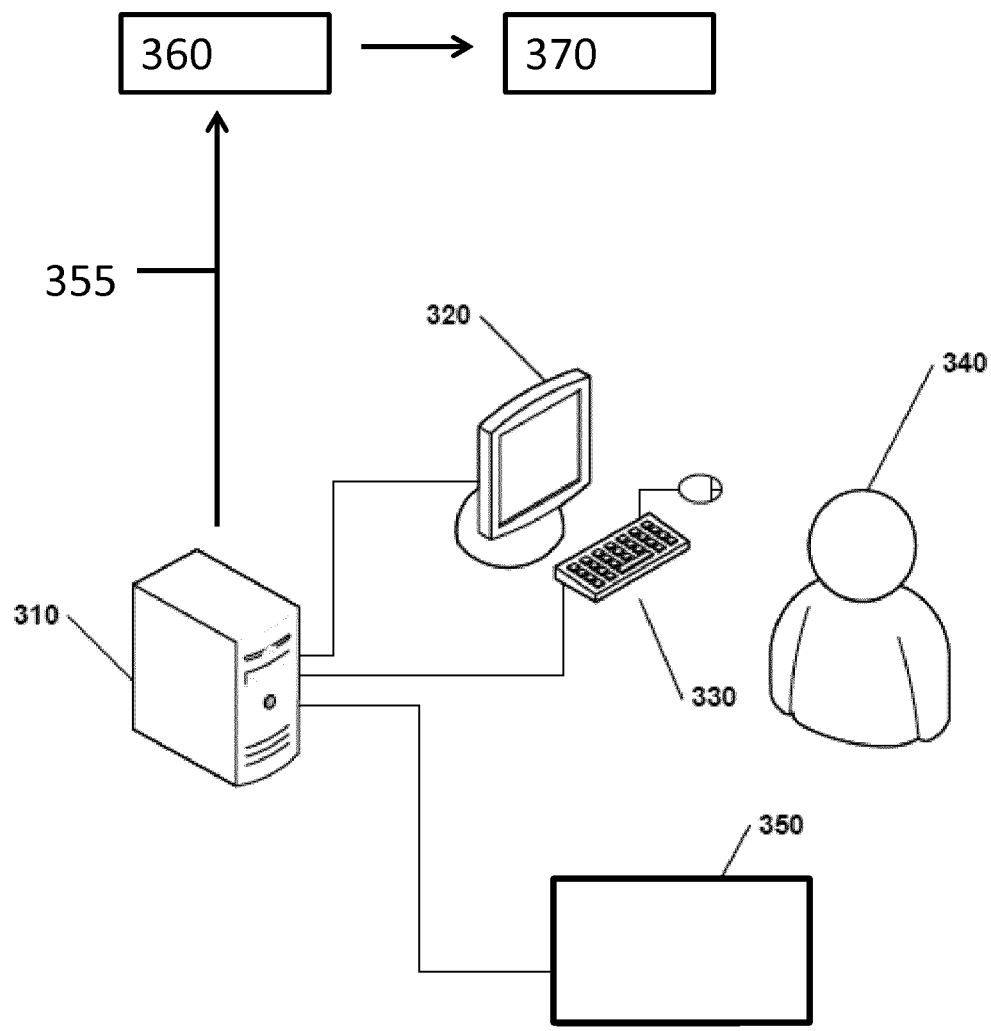
FIG. 11 is a system according to certain embodiments of the present disclosure.

The communication among the various components of system of FIG. 11 may be accomplished via any appropriate coupling, including USB, VGA cables, coaxial cables, FireWire, serial cables, parallel cables, SCSI cables, IDE cables, SATA cables, wireless based on 802.11 or Bluetooth, or any other wired or wireless connection(s). One or more of the components in system may also be combined into a single unit. In some embodiments, all of the electronic components of system shown in FIG. 11 are included in a single physical unit.

Figure 12:
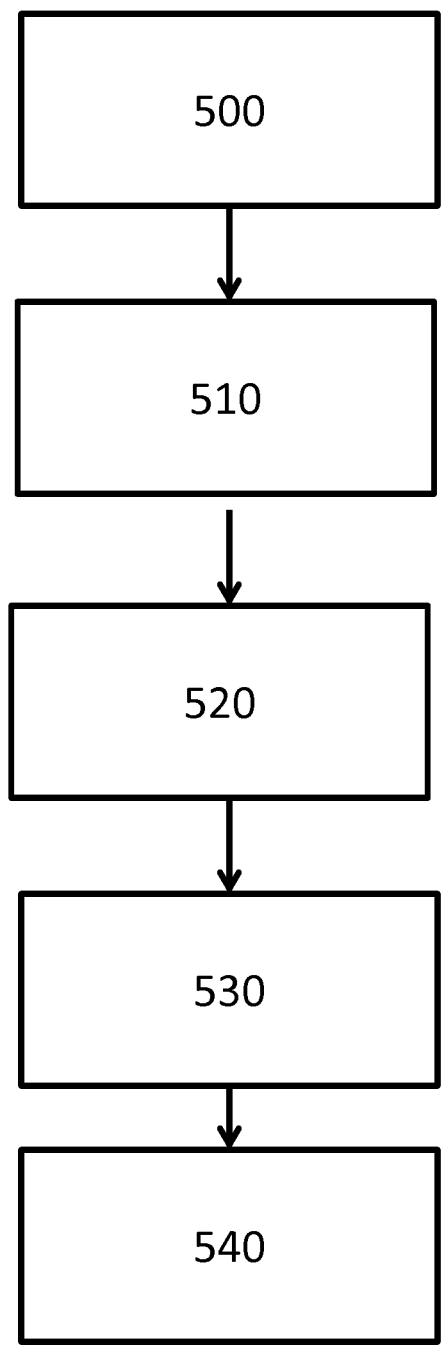
FIG. 12 is a flow chart a method according to certain embodiments of the present disclosure.

With reference now to FIG. 12, in one embodiment of use, in an initial point 500, an implant 3, 40 is provided and then implanted in bone tissue of a patient. In a next step 510, the base part 2, 10, 10' can be coupled to the dental implant 3, 40. The healing cap 1, 72, 272 according to an embodiment described herein can be coupled to the base part 2, 10, 10' in a step 520. After the healing cap 1, 72, 272 is coupled to the base part 2, 10, 10', an intra oral scanner or other scanning instrument can be used to scan the top surface of the healing cap 1, 72, 272 in a step 530. As described above, the information gathered from the healing cap 1, 72, 272 can be used to determine the position and orientation of the top surface 18, 18' and/or index portion 25, 25' of the base part 10, 10'. The position and orientation of the top surface 18, 18' and/or index portion 25, 25' of the base part 10, 10' can then be used in the design and/or manufacturing of the a final restoration 4, 66, 68. After a period of time (e.g., healing and osseointegration period), in a step 540, the healing cap 1, 72, 272 in can be removed from the base part 2, 10, 10' and a component, such as the dental restoration (e.g., final restorations 4, 66, 68), like a single tooth, a bridge, or other framework, can be affixed to the base part 2, 10, 10' at a connection interface thereof. As noted above, the final restoration can be designed and/or made based on the information (position and orientation) gathered from the healing cap 1, 72, 272. As noted herein, an advantage of this arrangement, is that the base part 2, 10, 10' does not have to be removed, which can reduce trauma to the patient's gum tissue. As described above, the final restoration 4, 66, 68 can be designed with the knowledge of the exact position and orientation of base part 2, 10, 10' which can be determined from the scan of the healing cap 1, 72, 272 and the information derived therefrom. The scan of the healing cap 1, 72, 272 can be taken before, during or after the period of time (e.g., healing and osseointegration period). As noted below, in certain embodiments, a physical impression of the healing cap 1, 72, 272 can be taken in addition to or as an alternative e to taking intra-oral scan of the healing cap 1, 72, 272.

The processes, computer readable medium, and systems described herein may be performed on various types of hardware, such as computer systems. In computer systems may include a bus or other communication mechanism for communicating information, and a processor coupled with the bus for processing information. A computer system may have a main memory, such as a random access memory or other dynamic storage device, coupled to the bus. The main memory may be used to store instructions and temporary variables. The computer system may also include a read-only memory or other static storage device coupled to the bus for storing static information and instructions. The computer system may also be coupled to a display, such as a CRT or LCD monitor. Input devices 330 may also be coupled to the computer system. These input devices 330 may include a mouse, a trackball, or cursor direction keys. Computer systems described herein may include the computer 310, display 320, scanner 350, and/or input devices 330. Each computer system may be implemented using one or more physical computers or computer systems or portions thereof. The instructions executed by the computer system may also be read in from a computer-readable medium. The computer-readable medium may be a CD, DVD, optical or magnetic disk, laserdisc, carrier wave, or any other medium that is readable by the computer system. In some embodiments, hardwired circuitry may be used in place of or in combination with software instructions executed by the processor.

The healing cap 1, 72, 272, 372, 472 embodiments described above can be made of a polymeric material such as a polyether ether ketone (PEEK) in other embodiments the healing cap 1, 72, 272, 372, 472 can be made of other materials such as a metal (e.g., titanium). In the healing cap 1, 72, 272, 372, 472 embodiments described above the healing cap 1, 72, 272, 372, 472 can be made of a single monolithic piece of material (e.g., injection molded) however, in modified embodiments, the healing cap 1, 72, 272 can be made from multiple pieces and/or pieces of different materials. For example, in certain embodiments of the healing cap 1, 72, 272, 372, 472 the apical portion 76, 276 of healing cap 1, 1, 72, 272, 372, 472 that contacts the base part 10, 10' can be made of a metallic and/or ceramic material and the upper portion of the healing cap 1, 72, 272, 372, 472 that is configured to be scanned can be made of plastic or polymer material.

In certain embodiments, the healing cap 1, 72, 272, 372, 472 can be provided with an RFID and/or color configuration. In such embodiments, in addition to or as alternative to the shape of the top surface the RFID and/or color configuration can provide information regarding the physical characterizes of healing cap 1, 72, 272, 372, 472 or base part 2, 10, 10' and/or implant 3, 40 and/or the position and orientation of such components. For example, in some embodiments, a set of healing caps 1, 72, 272, 372, 472 can be provided wherein the color of the healing cap 1, 72, 272, 372, 472 corresponds to the base diameter and/or height of the healing cap healing cap 1, 72, 272, 372, 472.

In certain embodiments a side surface 85, 285, 385, 485 of the healing cap 1, 72, 272, 372, 472 can form a shape or include features that can provide information regarding the physical characterizes of healing cap 1, 72, 272, 372, 472 or base part 2, 10, 10' and/or implant 3, 40 and/or the position and orientation of such components. For example, the side surface 85, 285, 385, 485 can have an asymmetrical shape that can be shaped matched as described herein in order to provide information regarding the physical characterizes of healing cap 1, 72, 272, 372, 472 or base part 2, 10, 10' and/or implant 3, 40 and/or the position and orientation of such components.

As mentioned above, the healing cap can also be configured such that it directly attached to the apical end of the dental implant in a manner such as a cover screw is used. In such an embodiment, the apical portion 76, 276, 376, 476 of the healing cap 72, 272, 376, 476 which contacts healing the dental implant can be made of a metallic and/or ceramic material and the upper portion of the healing cap 72, 272, 372, 472 that is configured to be scanned can be made of plastic or polymer material.

In one embodiment, the apical portion 76, 276, 376, 476 of the healing cap 1, 72, 272, 372, 472 can be modified (e.g., milled) can be after it is scanned such that it better conforms to the patient's anatomy and/or that it can be used as part of a temporary and/or final restoration. In certain embodiments, the shape of the top surface described herein can be milled directly onto existing healing components.

Although not illustrated in modified embodiments of the healing caps 1, 72, 272, 372, 472 the external side surface 86, 286 can have retention features such as grooves or ridges that can receive cement such that the healing cap can support a cement-retained temporary restoration. In addition to or as an alternative, the healing cap 1, 72, 272, 372, 472 in certain modified embodiments can include a retention groove or ring such that a temporary restoration can be snapped onto to the healing cap 1, 72, 272, 372, 472 and held by a snap fit.

In modified embodiments, the healing caps 1, 72, 272, 372, 472 described below can be used in method and a technique in which a physical impression is taken of the top surface 98, 298 of the healing cap 1, 72, 272, 372, 472. In such a procedure, the impression can be used to record the position and orientation of a top surface 98, 298, 498 of healing cap 1, 72, 272, 372, 472. A scanner can then be used to scan the physical impression. In a modified embodiment, the top surface 98, 298, 398, 498 of healing cap 1, 72, 272, 372, 472 can then be reproduced in a stone or plaster analogue of the patient's mouth. In certain embodiments, the in a stone or plaster analogue of the patient's mouth can be scanned. In certain arrangements, a technician can construct a final restoration stone or plaster analogue. In certain arrangements, the final restoration can be designed based on the scanned physical impression or stone or plaster analogue.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described herein may be embodied in, and fully automated via, software code modules executed by one or more general purpose computers or processors, such as those computer systems described herein. The code modules may be stored in any type of computer-readable medium or other computer storage device. Some or all of the methods may alternatively be embodied in specialized computer hardware.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A healing cap or a scan body for coupling to a dental component, comprising
    an apical end;
    a coronal end comprising a side surface and a planar top surface, the planar top surface having an edge that forms an asymmetrical shape with respect to a central longitudinal axis of the healing cap or scan body, the edge defining a boundary between the side surface and the planar top surface of the coronal end, the edge extending continuously about a circumference of the planar top surface and forming a continuous convex shape, the planar top surface that is circumscribed by the edge being free from any protrusion extending above the planar top surface, the planar top surface having a maximum diameter,
    wherein the asymmetrical shape includes a first portion having an elliptical shape with a first eccentricity and a second portion having an elliptical shape with a second eccentricity and wherein the healing cap or scan body comprises an external side surface extending from the coronal end to the apical end of the healing cap or scan body, at least a portion of the external side surface of the healing cap or scan body tapers outwardly from a longitudinal axis as the portion of the external side surface extends from the coronal end towards the apical end, an apically facing lower surface at the apical end having a maximum diameter that is greater than the maximum diameter of the planar top surface, wherein the apical end includes an index portion with at least one protrusion spaced about a cylindrical post.

2. The healing cap or the scan body of claim 1, comprising an internal bore extending from the apical end to the coronal end of the healing cap or the scan body.

3. The healing cap or the scan body of claim 1 wherein the edge is rounded or beveled.

4. The healing cap or the scan body of claim 1, wherein the asymmetrical shape has a length L1 in an x direction and length L2 in a y direction which forms an aspect ratio L1/L2 that less than or greater than 1.

5. The healing cap or scan body of claim 1, wherein the planar top surface lies perpendicular to the longitudinal axis of the healing cap or the scan body.

6. The healing cap or the scan body of claim 1, wherein the side surface tapers apically, along the longitudinal axis of the healing cap or the scan body, from a smaller top diameter Dt at a coronal end of the healing cap or the scan body to a larger base diameter and then extends further apically with a substantially cylindrical shape.

7. The healing cap or the scan body of claim 1 wherein the planar top surface includes a region that does not extend perpendicular to the longitudinal axis of the healing cap or the scan body.

8. A healing cap or a scan body for coupling to a dental component, comprising
    an apical end;
    a coronal end comprising a side surface and a planar top surface, the planar top surface having an edge that forms an asymmetrical shape with respect to a central longitudinal axis of the healing cap or scan body, the edge defining a boundary between the side surface and the planar top surface of the coronal end, the edge extending continuously about a circumference of the planar top surface and forming a continuous convex shape, the planar top surface that is circumscribed by the edge being free from any protrusion extending above the planar top surface, the planar top surface having a maximum diameter,
    wherein the asymmetrical shape includes a first portion having an elliptical shape with a first eccentricity and a second portion having an elliptical shape with a second eccentricity and wherein the healing cap or scan body comprises an external side surface extending from the coronal end to the apical end of the healing cap or scan body, at least a portion of the external side surface of the healing cap or scan body tapers outwardly from a longitudinal axis as the portion of the external side surface extends from the coronal end towards the apical end, an apically facing lower surface at the apical end having a maximum diameter that is greater than the maximum diameter of the planar top surface, wherein the apical end includes an index portion that includes six protrusions spaced equally about a cylindrical post.

9. A method of creating a dental restoration using a healing cap or a scan body for coupling to a dental component, comprising an apical end; a coronal end comprising a side surface and a top surface, the top surface having an edge that forms an asymmetrical shape with respect to a central longitudinal axis of the healing cap or scan body, the edge defining a boundary between the side surface and the top surface of the coronal end, the edge extending continuously about a circumference of the top surface and forming a continuous convex shape wherein the asymmetrical shape includes a first portion having an elliptical shape with a first eccentricity and a second portion having an elliptical shape with a second eccentricity and wherein the healing cap or scan body comprises an external side surface extending from the coronal end to the apical end of the healing cap or scan body, at least a portion of the external side surface of the healing cap or scan body tapers outwardly from a longitudinal axis as the portion of the external side surface extends from the coronal end to the apical end, an apically facing lower surface at the apical end having a maximum diameter that is greater than the maximum diameter of the planar top surface, said method comprising:
  scanning the edge of the top surface of the healing cap or the scan body with an intra-oral scanner or taking an impression of the healing cap or of the scan body;
  using information from scanning the edge of the top surface of the healing cap or of the scan body with an intra-oral scanner or taking an impression of the healing cap or of the scan body to design a dental restoration; and
  producing the dental restoration designed.

10. The method of claim 9, wherein the apically facing lower surface is planar.

11. The method of claim 10, wherein the apically facing lower surface is horizontal.

12. The method of claim 11, wherein the healing cap or the scan body includes a post extending from the lower surface.

13. A healing abutment system, comprising:
  a base part configured to be attached to a dental implant, the base part configured to selectively support a final restoration and having an outer surface that corresponds to a height of soft tissue adjacent the installed dental implant;
  a healing cap for coupling to a dental component, the healing cap comprising an apical end;
    a coronal end comprising a side surface and a planar top surface, the planar top surface having an edge that forms an asymmetrical shape with respect to a central longitudinal axis of the healing cap, the edge defining a boundary between the side surface and the planar top surface of the coronal end, the edge extending continuously about a circumference of the planar top surface and forming a continuous convex shape, the planar top surface that is circumscribed by the edge being free from any protrusion extending above the planar top surface, the planar top surface having a maximum diameter,
  wherein the asymmetrical shape includes a first portion having an elliptical shape with a first eccentricity and a second portion having an elliptical shape with a second eccentricity and wherein the healing cap comprises an external side surface extending from the coronal end to the apical end of the healing cap, at least a portion of the external side surface of the healing cap tapers outwardly from a longitudinal axis as the portion of the external side surface extends from the coronal end towards the apical end, an apically facing lower surface at the apical end having a maximum diameter that is greater than the maximum diameter of the planar top surface, the healing cap configured to be coupled to the base part, the healing cap having at least one feature configured to be scanned by an intra-oral scanner or transferred to a physical impression to transfer information regarding the orientation and position of the base part.

14. A healing cap or a scan body for coupling to a dental component, comprising
  an apical end;
  a coronal end comprising a side surface and a planar top surface, the planar top surface having an edge that forms an asymmetrical shape with respect to a central longitudinal axis of the healing cap or scan body, the edge defining a boundary between the side surface and the planar top surface of the coronal end, the edge extending continuously about a circumference of the planar top surface and forming a continuous convex shape, the planar top surface that is circumscribed by the edge being free from any protrusion extending above the planar top surface, the planar top surface having a maximum diameter,
  wherein the asymmetrical shape includes a first portion having an elliptical shape with a first eccentricity and a second portion having an elliptical shape with a second eccentricity and wherein the healing cap or scan body comprises an external side surface extending from the coronal end to the apical end of the healing cap or scan body, at least a portion of the external side surface of the healing cap or scan body tapers outwardly from a longitudinal axis as the portion of the external side surface extends from the coronal end towards the apical end, an apically facing lower surface at the apical end having a maximum diameter that is greater than the maximum diameter of the planar top surface, wherein the apically facing lower surface is planar.

15. The healing cap or the scan body of claim 14, wherein the apically facing lower surface is horizontal.

16. The healing cap or the scan body of claim 15, wherein the healing cap or the scan body includes a post extending from the lower surface.

* * * * *